US010857406B2

(12) United States Patent
Reina et al.

(10) Patent No.: US 10,857,406 B2
(45) Date of Patent: Dec. 8, 2020

(54) EXERCISE SYSTEMS FOR USE WITH TOOLS HAVING WEIGHTED MASSES THAT ARE SWUNG TO MAKE HOLES IN ROOFS, WALLS AND DOORS

(71) Applicants: Nazareno Reina, Stewartsville, NJ (US); Peter Marino, Cranford, NJ (US)

(72) Inventors: Nazareno Reina, Stewartsville, NJ (US); Peter Marino, Cranford, NJ (US)

( * ) Notice: Subject to any disclaimer, the term of this patent is extended or adjusted under 35 U.S.C. 154(b) by 59 days.

(21) Appl. No.: 16/357,600

(22) Filed: Mar. 19, 2019

(65) Prior Publication Data

US 2020/0298044 A1    Sep. 24, 2020

(51) Int. Cl.
*A63B 21/02* (2006.01)
*A63B 21/06* (2006.01)
*A63B 23/12* (2006.01)
*G09B 19/00* (2006.01)
*F16F 3/10* (2006.01)
*A63B 21/04* (2006.01)
*A63B 21/05* (2006.01)

(52) U.S. Cl.
CPC ........ *A63B 21/025* (2013.01); *A63B 21/0601* (2013.01); *A63B 23/1209* (2013.01); *F16F 3/10* (2013.01); *G09B 19/003* (2013.01); *A63B 21/023* (2013.01); *A63B 21/0407* (2013.01); *A63B 21/05* (2013.01); *A63B 2209/00* (2013.01); *F16F 2224/02* (2013.01); *F16F 2224/025* (2013.01); *F16F 2224/0225* (2013.01)

(58) Field of Classification Search
CPC .............. A63B 21/4019; A63B 21/025; A63B 21/0601; A63B 21/08; A63B 21/0083; A63B 21/0087; A63B 21/1681; A63B 21/404; A63B 21/05; A63B 21/04; A63B 21/07; A63B 23/1209; A63B 5/00; A63B 5/08
USPC ........................................................... 463/7
See application file for complete search history.

(56) References Cited

U.S. PATENT DOCUMENTS

| 3,162,440 | A |   | 12/1964 | Argiro |
| 3,826,480 | A | * | 7/1974 | Johnson ........... A63B 23/03525 |
|  |  |  |  | 267/196 |
| 3,873,089 | A |   | 3/1975 | Krug |
| 4,836,533 | A |   | 6/1989 | Dong |
| 5,415,552 | A |   | 5/1995 | Harmon et al. |
| 6,318,148 | B1 |   | 11/2001 | Alkonis |
| 6,598,365 | B2 | * | 7/2003 | Abraham .............. E04F 15/225 |
|  |  |  |  | 267/160 |

(Continued)

*Primary Examiner* — Megan Anderson
(74) *Attorney, Agent, or Firm* — Doherty IP Law Group LLC

(57) ABSTRACT

An exercise system for use with tools having weighted masses includes a housing having an upper end and a lower end, and a strike post having an upper end that is located above the upper end of said housing and a lower end that is located between the upper and lower ends of the housing. The strike post is configured to move along a vertical axis that extends between the upper and lower ends of the housing. A shock absorbing pad overlies the upper end of the strike post. A spring assembly is disposed between the lower end of the strike post and the lower end of the housing. During a physical exercise session, the shock absorbing pad is hit with a toll having a weighted mass to apply an impact force, which is transferred through the strike post to the spring assembly for compressing the spring assembly.

19 Claims, 23 Drawing Sheets

(56) References Cited

U.S. PATENT DOCUMENTS

| | | |
|---|---|---|
| 7,614,990 B2 * | 11/2009 | Baek ................... A63B 22/14 |
| | | 482/146 |
| 7,645,221 B1 | 1/2010 | Curry |
| 7,857,729 B2 | 12/2010 | Sullivan et al. |
| 8,002,676 B1 | 8/2011 | Corona et al. |
| 8,182,401 B2 | 5/2012 | Clemons |
| 8,668,190 B1 | 3/2014 | Heruska et al. |
| 8,888,666 B2 | 11/2014 | Quader |
| 8,998,784 B1 * | 4/2015 | Sloan ................ A63B 21/0085 |
| | | 482/146 |
| 9,717,940 B1 * | 8/2017 | Schueler ............ A63B 71/0054 |
| 10,682,550 B2 * | 6/2020 | Monak ................ A63B 26/003 |
| 2003/0060340 A1 | 3/2003 | Freeman |
| 2004/0058787 A1 | 3/2004 | Lin |
| 2012/0149539 A1 | 6/2012 | Quader |
| 2012/0214650 A1 | 8/2012 | Jahns |
| 2013/0109365 A1 | 5/2013 | Buzdugan |
| 2014/0309081 A1 | 10/2014 | Gavigan |
| 2015/0352397 A1 * | 12/2015 | Essapen ........... A63B 23/03508 |
| | | 482/128 |
| 2015/0375031 A1 * | 12/2015 | Tong ................... A63B 21/05 |
| | | 482/128 |

* cited by examiner

EXERCISE SYSTEMS FOR USE WITH TOOLS HAVING WEIGHTED MASSES THAT ARE SWUNG TO MAKE HOLES IN ROOFS, WALLS AND DOORS

BACKGROUND OF THE INVENTION

Field of the Invention

The present patent application is generally related to exercises for improving muscle strength and stamina, and is more specifically related to exercise systems and devices that are used with tools having elongated handles and weighted masses.

Description of the Related Art

It is critical for fire fighters to develop and maintain high levels of strength and stamina for performing various fire fighting tasks. One essential task is the ability to use axes for knocking holes in roofs, walls and doors. This requires a fire fighter to swing an axe with sufficient force and momentum to create holes in roofs, walls and doors. A single blow with an axes rarely accomplishes the task so that repeated blows with the axe are typically required.

In order to successfully accomplish the task, every axe strike must be strong enough to damage the structure. Merely bouncing an axe off of a roof, wall or door would be fruitless. Thus, a fire fighter must have the strength to deliver sufficiently strong blows and the endurance and stamina to repeatedly strike the structure with a damaging effect.

The have been efforts directed to testing the ability of individuals to use axes and sledge hammers for making holes in walls and doors. For example, U.S. Pat. No. 6,318,148 to Alkonis discloses a testing device that measures an individual's capacity to achieve a desired result and how long it takes the individual to achieve the result. The testing device includes a base and a target that is slidably mounted to the base. A brake is positioned between the target and the base to resist movement of the target when the target is stuck by a mass (e.g., a sledge hammer) The brake is adjustable to enable its resistance to be calibrated.

The Alkonis tester resists the movement of the target toward the base in such a way as to reflect the capacity and/or ability of the tested person to exert sufficient blows in a sufficiently limited period of time to do the work required. If the individual passes the test, he or she has demonstrated the capacity to deliver satisfactory striking blows under active conditions.

There have been developments directed to providing exercise devices for improving the strength and stamina required for overhead hammering activities. For example, U.S. Pat. No. 8,182,401 to Clemons discloses an exercise device that is struck by swinging a tool having an elongated handle and a mass attached to an end of the elongated handle. The exercise device includes an impact absorbing assembly that receives an impact force imparted by the mass. The exercise device includes an impact block mechanically integrated with the impact absorbing assembly. The impact absorbing assembly operates to dissipate energy transferred from the mass as the mass strikes the impact block. The impact absorbing assembly includes a shock-absorbing spring.

The Clemons exercise device includes a platform assembly that supports the impact absorbing assembly and the shock-absorbing spring in an orientation that is consistent with at least one objective of the physical exercise workout session. For example, certain muscle groups may be exercised via an overhand swing of the mass, which is facilitated by a vertical orientation of the impact absorbing assembly. The platform assembly rests on a mat that provides scuff protection for a floor and provides additional shock absorption to the exercise device.

In spite of the above advances, there remains a continuing need for exercise devices that may be used to improve strength and endurance, such as improving the strength and endurance of fire fighters who are required to use tools having masses for creating holes in roofs, walls and doors. There is also a need for exercise devices that allow for training to improve the aim and accuracy of individuals swinging axes and sledge hammers at targets.

SUMMARY OF THE INVENTION

In one embodiment, an exercise system for use with tools having weighted masses, such as axes and sledge hammers, preferably includes a housing having an upper end and a lower end, and a strike post having an upper end that is located above the upper end of the housing and a lower end that is located between the upper and lower ends of the housing. In one embodiment, the strike post is configured to move along a vertical axis that extends between the upper and lower ends of the housing.

In one embodiment, the exercise system desirably includes a shock absorbing pad that overlies the upper end of the strike post.

In one embodiment, a spring assembly is disposed between the lower end of the strike post and the lower end of the housing. In one embodiment, during a physical exercise session, a tool with a weighted mass may be used to apply an impact force to the shock absorbing pad, which is transferred through the strike post to the spring assembly for compressing the spring assembly.

In one embodiment, the housing may include a base having a central pedestal and first and second lateral pedestals located on opposite sides of the central pedestal. In one embodiment, the housing may include a first lateral support post positioned atop the first lateral pedestal of the base, and a second lateral support post positioned atop the second lateral pedestal of the base.

In one embodiment, the spring assembly is desirably positioned atop the central pedestal of the base and is disposed between the first and second lateral support posts.

In one embodiment, the first lateral pedestal of the base may have a top surface that extends horizontally relative to the vertical axis of movement of the strike post. In one embodiment, the second lateral pedestal of the base may have a top surface that extends horizontally relative to the vertical axis of movement of the strike post.

In one embodiment, the central pedestal of the base preferably has a top surface that extends horizontally relative to the vertical axis of movement of the strike post. In one embodiment, the top surfaces of the first and second lateral pedestals of the base preferably lie in a common plane. In one embodiment, the top surface of the central pedestal lies in a plane that is parallel with the common plane of the top surfaces of the respective first and second lateral pedestals.

In one embodiment, the top surface of the central pedestal of the base is closer to the upper end of the housing than the top surfaces of the respective first and second lateral pedestals of the base.

In one embodiment, the first lateral support post has an upper end with a top surface and a lower end with a bottom surface. In one embodiment, the bottom surface of the first lateral support post engages the top surface of the first lateral pedestal of the base.

In one embodiment, the second lateral support post has an upper end with a top surface and a lower end with a bottom surface. In one embodiment, the bottom surface of the second lateral support post engages the top surface of the second lateral pedestal of the base.

In one embodiment, the spring assembly may include a helical spring having an upper end and a lower end, an upper plate secured to the upper end of the helical spring, and a lower plate secured to the lower end of the helical spring. In one embodiment, the upper plate of the spring assembly is in contact with a bottom surface at the lower end of the strike post and the lower plate of the spring assembly is in contact with the top surface of the central pedestal of the base. In one embodiment, the helical spring is desirably in alignment with the vertical axis of movement of the strike post.

In one embodiment, the housing may include a first outer wall secured to front faces of the respective first and second lateral support posts and a front face of the base, and a second outer wall secured to rear faces of the first and second lateral support posts and a rear face of the base. In one embodiment, the spring assembly and the lower end of the strike post are desirably disposed between the first and second outer walls. In one embodiment, the strike post is free to move along the vertical axis relative to the first and second outer walls.

In one embodiment, the housing may include a first lower support brace secured to a lower end of the first outer wall, and a second lower support brace secured to a lower end of the second outer wall. In one embodiment, the housing may include a first upper support brace secured to an upper end of the first outer wall, and a second upper support brace secured to an upper end of the second outer wall. The upper and lower support braces preferably enhance the structural integrity of the housing.

In one embodiment, the top surfaces of the respective first and second lateral support posts lie in a common plane and define the upper end of the housing.

In one embodiment, the upper end of the strike post has a top surface that lies in a plane that is parallel with the common plane of the top surfaces of the respective first and second lateral support posts.

In one embodiment, a first lateral shock absorbing pad may overlie the top surface of the first lateral support post, and a second lateral shock absorbing pad may overlie the top surface of the second lateral support post.

In one embodiment, the first and second lateral shock absorbing pads are desirably located on opposite sides of the shock absorbing pad that overlies the upper end of the strike post.

In one embodiment, the upper end of the strike post preferably includes a horizontally extending top surface, and the shock absorbing pad is secured over the horizontally extending top surface of the strike post.

In one embodiment, the shock absorbing pad overlying the upper end of the strike post may be made of various materials including but not limited to rubbers, foams, and/or polymers.

In one embodiment, an exercise system for use with tools having weighted masses preferably includes a housing having an upper end and a lower end, whereby the upper end of the housing defines a central region and first and second lateral regions that bound opposite sides of the central region.

In one embodiment, a strike post preferably projects from the central region of the upper end of the housing. The strike post may have an upper end with a top surface that is located above the upper end of the housing and a lower end with a bottom surface that is located between the upper and lower ends of the housing. In one embodiment, the strike post is configured to move along a vertical axis that extends between the upper and lower ends of the housing.

In one embodiment, a central shock absorbing pad preferably overlies the top surface of the strike post, a first lateral shock absorbing pad preferably overlies the first lateral region of the upper end of the housing, and a second lateral shock absorbing pad preferably overlies the second lateral region of the upper end of the housing.

In one embodiment, the exercise system desirably includes a spring assembly disposed between the bottom surface of the strike post and the lower end of the housing. In one embodiment, during a physical exercise session, an impact force applied is applied to the central shock absorbing pad and is transferred through the strike post to the spring assembly for compressing the spring assembly.

In one embodiment, the housing of the exercise system may include a base located at the lower end of the housing having a central pedestal and first and second lateral pedestals located on opposite sides of the central pedestal. In one embodiment, a first lateral support post may be positioned atop the first lateral pedestal of the base. The first lateral support post may have an upper end that defines the first lateral region of the upper end of the housing.

In one embodiment, a second lateral support post may be positioned atop the second lateral pedestal of the base. In one embodiment, the second lateral support post preferably has an upper end defining the second lateral region of the upper end of the housing.

In one embodiment, the spring assembly is desirably positioned atop the central pedestal of the base and is disposed between the first and second lateral support posts.

In one embodiment, the first lateral pedestal of the base desirably has a top surface that extends horizontally relative to the vertical axis of movement of the strike post.

In one embodiment, the second lateral pedestal of the base desirably has a top surface that extends horizontally relative to the vertical axis of movement of the strike post.

In one embodiment, the central pedestal of the base desirably has a top surface that extends horizontally relative to the vertical axis of movement of the strike post.

In one embodiment, the top surfaces of the first and second lateral pedestals of the base lie in a common plane, and the top surface of the central pedestal of the base desirably lies in a plane that is parallel with the common plane of the top surfaces of the first and second lateral pedestals of the base.

In one embodiment, the exercise system desirably includes the first lateral support post having the upper end with a top surface and a lower end with a bottom surface. In one embodiment, the bottom surface of the first lateral support post engages the top surface of the first lateral pedestal of the base.

In one embodiment, the exercise system desirably includes the second lateral support post having the upper end with a top surface and a lower end with a bottom surface. In one embodiment, the bottom surface of the second lateral support post desirably engages the top surface of the second lateral pedestal of the base.

In one embodiment, the spring assembly preferably includes a helical spring having an upper end and a lower end, an upper plate secured to the upper end of the helical spring, and a lower plate secured to the lower end of the helical spring. In one embodiment, the upper plate of the spring assembly is in contact with the bottom surface of the strike post and the lower plate of the spring assembly is in contact with the top surface of the central pedestal of the base. In one embodiment, the helical spring is preferably in alignment with the vertical axis of movement of the strike post.

In one embodiment, the exercise system desirably includes a first outer wall secured to front faces of the respective first and second lateral support posts and a front face of the base, and a second outer wall secured to rear faces of the first and second lateral support posts and a rear face of the base. In one embodiment, the spring assembly and the lower end of the strike post are desirably disposed between the first and second outer walls, and the strike post is free to move along the vertical axis relative to the first and second outer walls.

In one embodiment, the central shock absorbing pad and the first and second lateral shock absorbing pads are preferably made of various compliant and/or resilient materials including but not limited to rubbers, foams, and/or polymers.

These and other preferred embodiments of the present invention will be described in more detail below.

DETAILED DESCRIPTION OF PREFERRED EMBODIMENTS

Figure 1:
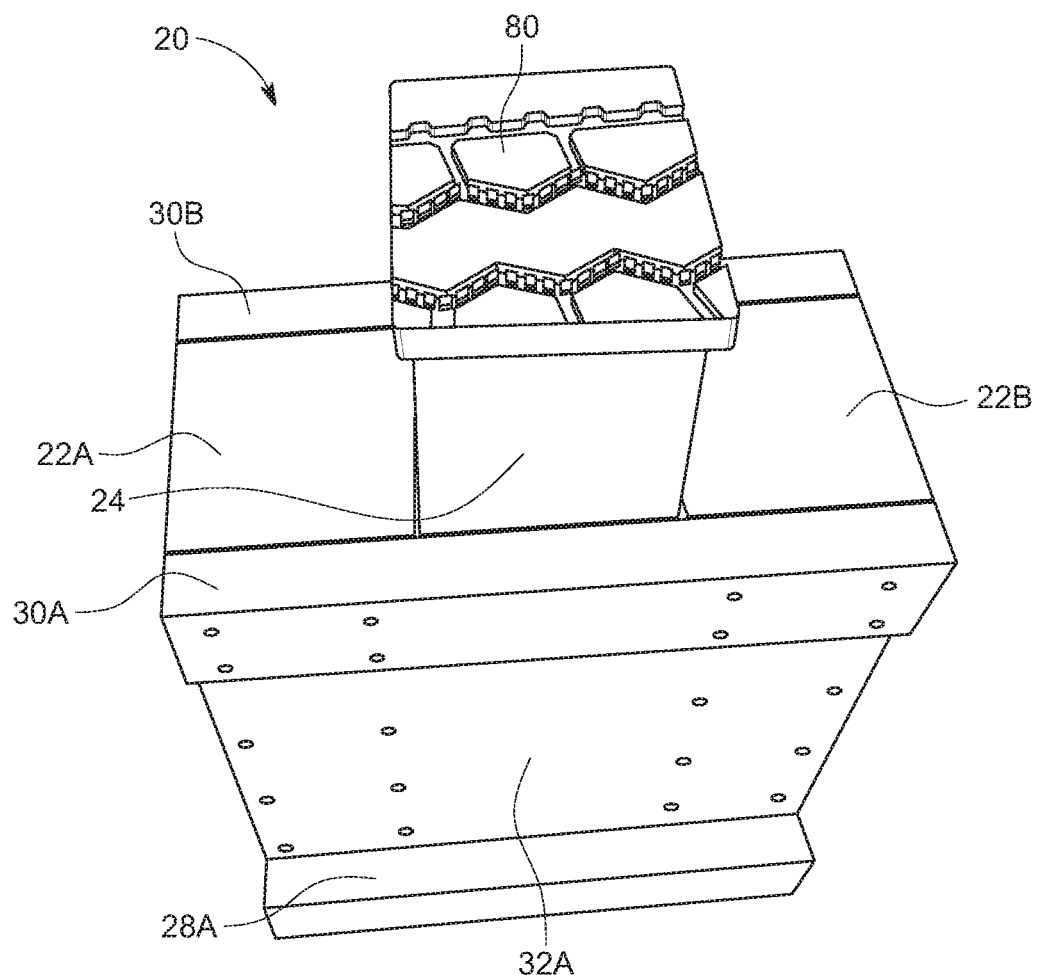
FIG. 1 is a perspective view of an axe exercise system, in accordance with one embodiment of the present patent application.

Referring to FIG. 1, in one embodiment, an axe exercise system 20 preferably includes first and second lateral support posts 22A, 22B that bound a strike post 24 having an upper end that is covered by a shock absorbing pad 80. The strike post 24 is preferably centrally located between the first and second lateral support posts 22A, 22B. The axe exercise system desirably includes a first lower support beam 28A, a second lower support beam 28B (FIG. 10), first and second upper support beams 30A, 30B, a first outer wall 32A that extends from the first lower support beam 28A to the first upper support beam 30A, and a second outer wall 32B (FIG. 10) that extends from the second lower support beam 28B (FIG. 10) to the second upper support beam 30B. As will be described in more detail herein, the axe exercise system 20 desirably includes a spring assembly that is disposed between the first and second lateral support posts 22A, 22B, and that is in contact with a lower end of the centrally located strike post 24.

Figure 2:
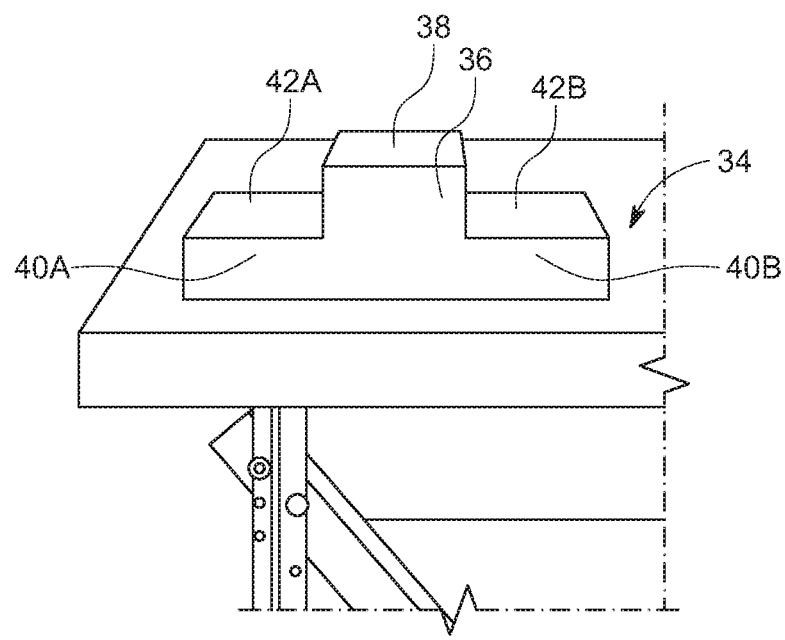
FIG. 2 shows a base of the axe exercise system shown in FIG. 1.

Referring to FIG. 2, in one embodiment, the axe exercise system 20 desirably includes an axe exercise system base 34 having a central platform 36 with a top surface 38, which is bounded by first and second lateral platforms 40A, 40B having respective top surfaces 42A, 42B. In one embodiment, the top surface 38 of the central platform 36 and the top surfaces 42A, 42B of the respective first and second lateral platforms 40A, 40B are flat, horizontally extending surfaces. In one embodiment, the top surface 38 of the central platform 36 is at a greater height than the top surfaces 42A, 42B of the respective first and second lateral platforms 40A, 40B of the base 34.

In one embodiment, the top surface 38 of the central platform 36 is adapted to engage a lower end of a spring assembly, as will be shown and described in more detail herein. The respective top surfaces 42A, 42B of the first and second lateral support platforms 40A, 40B are preferably configured to engage and support lower ends of the first and second lateral support posts 22A, 22B shown in FIG. 1.

Figure 3:
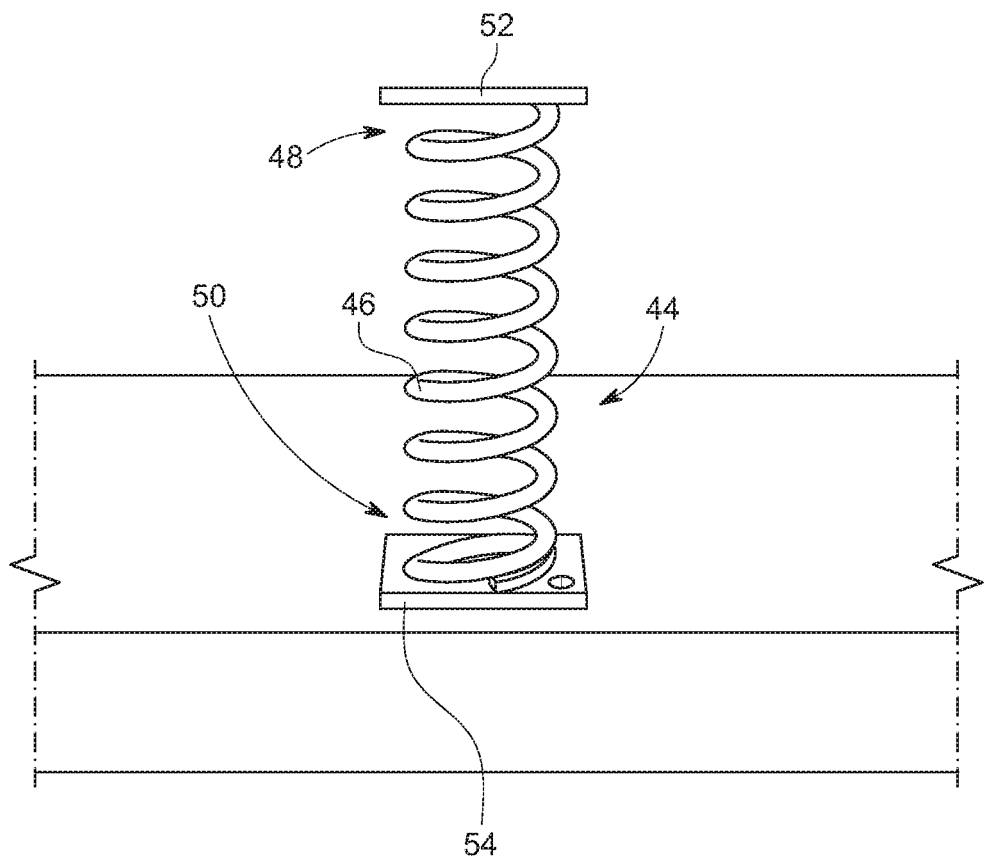
FIG. 3 shows a spring assembly of the axe exercise system shown in FIG. 1.

Referring to FIG. 3, in one embodiment, an axe exercise system 20 (FIG. 1) preferably includes a spring assembly 44 that includes a helical spring 46 having an upper end 48 and a lower end 50. The helical spring 46 is compressible for storing energy when it is compressed, and for releasing energy and returning to an extended position when an external compression force is released. In one embodiment, the spring assembly 44 preferably includes a first plate 52 that is secured to the upper end 48 of the helical spring 46 and a second plate 54 that is secured to the lower end 50 of the helical spring 46. In one embodiment, the first and second plates 52, 54 are secured to the respective upper and lower ends of the helical spring 46 by welding the plates to the helical spring. The plates 52, 54 may also be secured to the respective upper and lower ends of the helical spring 46 using fasteners. In one embodiment, the helical spring 46 is a compression spring so that when the first plate 52 is forced toward the second plate 54, the helical spring 46 is compressed therebetween. When the compressing force is removed, the helical spring 46 preferably release the stored energy as it returns to its initial, uncompressed configuration shown in FIG. 3.

Figure 4:
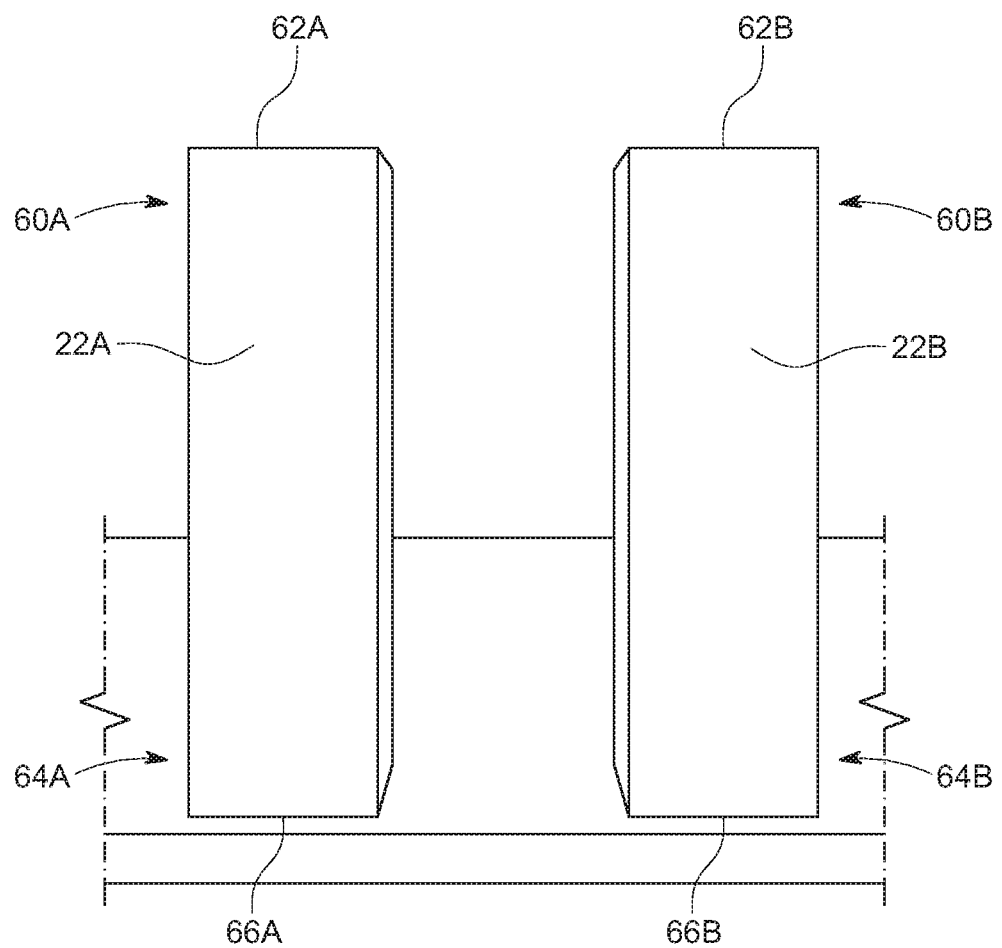
FIG. 4 shows a front elevation view of first and second lateral support posts of the axe exercise system shown in FIG. 1.

Referring to FIG. 4, in one embodiment, the axe exercise system 20 (FIG. 1) desirably includes the first lateral support post 22A and the second lateral support post 22B. In one embodiment, the first and second lateral support posts 22A, 22B may be elongated blocks having rectangular shapes, respectively. In one embodiment, the first lateral support post 22A has an upper end 60A with a flat top surface 62A and a lower end 64A with a flat bottom surface 66A. In one embodiment, the second lateral support post 22B preferably includes an upper end 60B with a flat top surface 62B and a lower end 64B with a flat bottom surface 66B.

Figure 5:
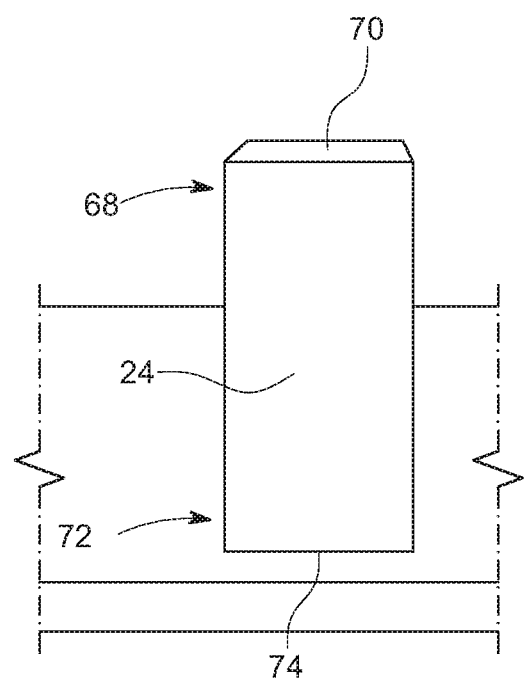
FIG. 5 shows a front elevation view of a strike post of the axe exercise system shown in FIG. 1.

Referring to FIG. 5, in one embodiment, the axe exercise system 20 desirably includes the strike post 24 (FIG. 1) that is adapted to be positioned between the first and second lateral support post 22A, 22B (FIGS. 1 and 4). In one embodiment, the strike post 24 preferably includes an upper end 68 having a flat top surface 70 and a lower end 72 having a flat bottom surface 74. In one embodiment, the flat top surface 70 of the strike post 24 is preferably adapted to receive a shock absorbing pad that preferably minimizes shock when the upper end of the strike post 24 is hit with a striking tool such as an axe or a sledge hammer.

Figure 6:
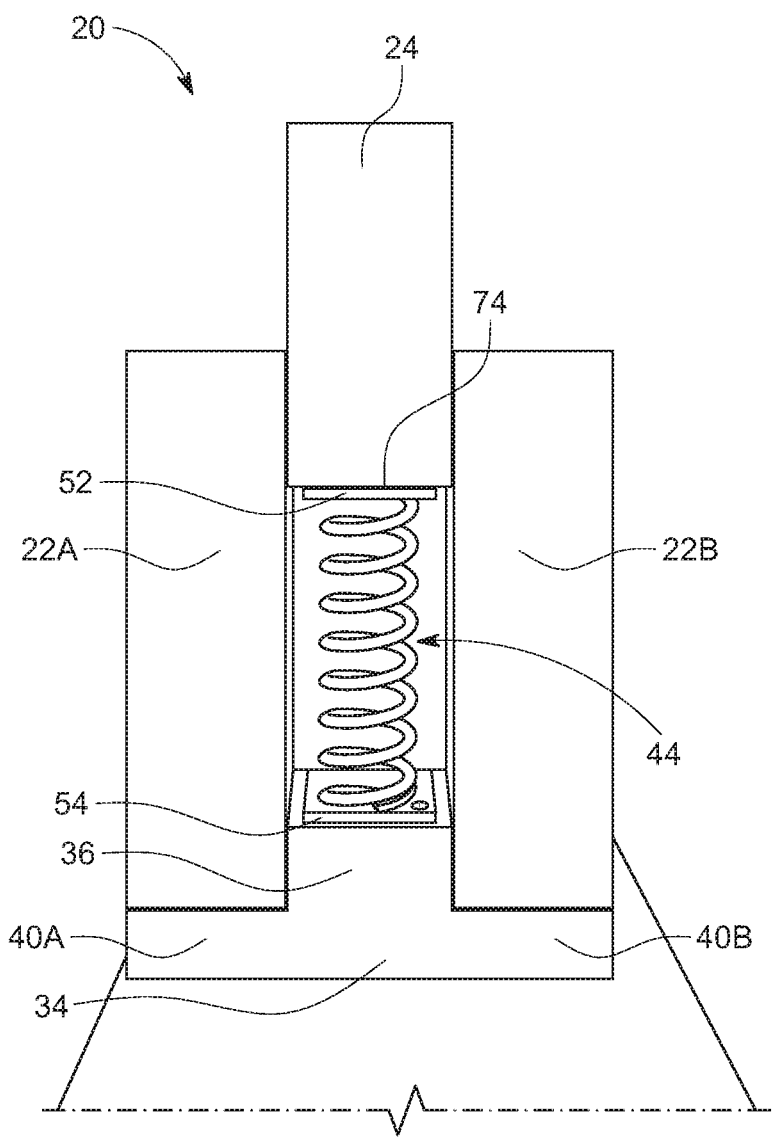
FIG. 6 shows a front elevation view of an axe exercise system subassembly including the base of FIG. 2, the spring assembly of FIG. 3, the first and second lateral support posts of FIG. 4, and the strike post of FIG. 5, in accordance with one embodiment of the present patent application.

Referring to FIG. 6, in one embodiment, the axe exercise system 20 may be assembled by positioning the base 34 atop a support surface. In one embodiment, the first lateral support post 22A is positioned over the flat top surface of the first lateral support platform 40A of the base 34, and the second lateral support post 22B is positioned over the flat top surface of the second lateral support platform 40B of the base 34. The spring assembly 44 is desirably positioned between the first and second lateral support posts 22A, 22B. The second plate 54 at the lower end of the spring assembly 44 preferably sits atop the flat top surface of the central platform 36 of the base 34. The strike post 24 is desirably positioned between the first and second lateral support posts 22A, 22B with the flat bottom surface 74 of the strike post 24 contacting the first plate 52 of the spring assembly 44.

In one embodiment, when a force is applied to the top surface of the strike post 24, the strike post 24 moves toward the base 34 for compressing the spring assembly 44 between the lower end of the strike post and the flat top surface of the central platform 36 of the base 34.

Figure 7:
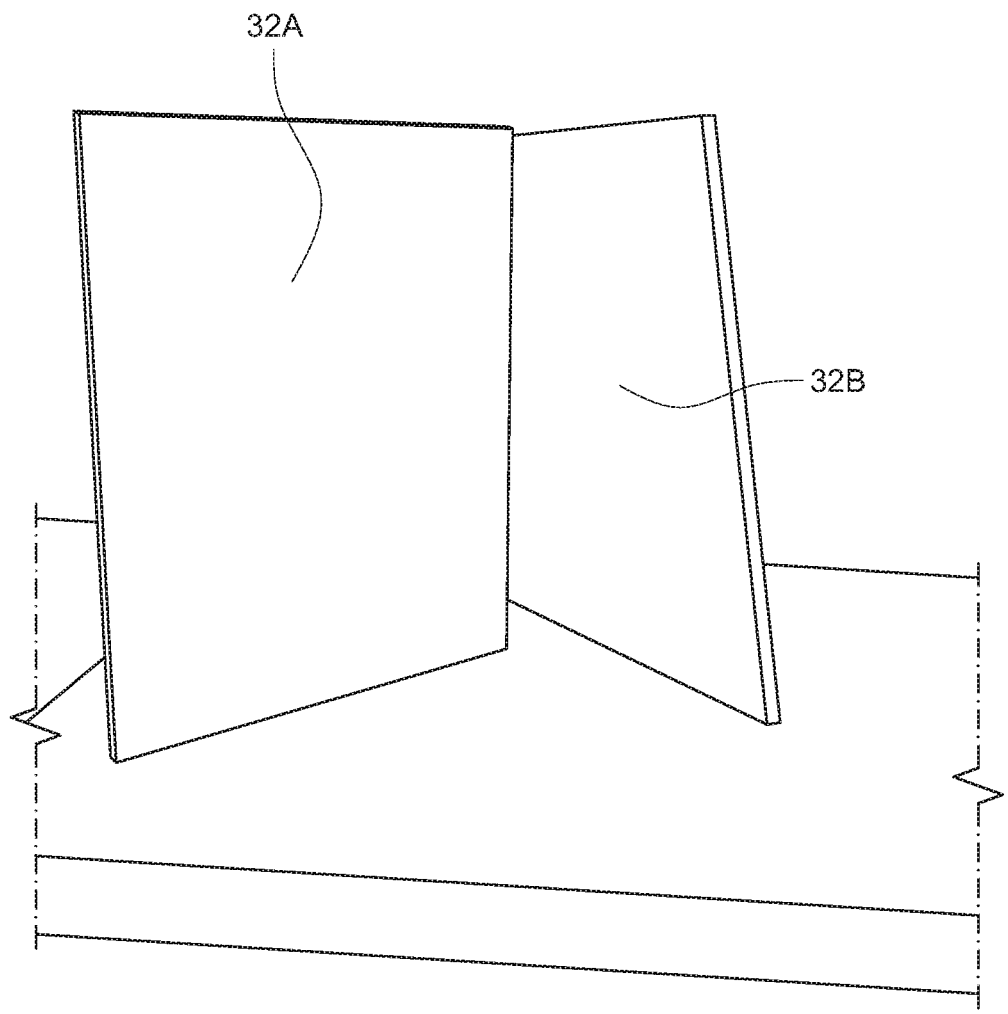
FIG. 7 shows first and second outer walls securable to the axe exercise system subassembly of FIG. 6, in accordance with one embodiment of the present patent application.

Referring to FIG. 7, in one embodiment, the axe exercise system 20 (FIG. 1), preferably includes first and second outer walls 32A, 32B that are assembled with the first and second lateral support posts 22A, 22B for encasing the spring assembly 44 (FIG. 3) and the lower end of the strike post 24 (FIG. 6) between the outer walls. In one embodiment, the first and second outer walls 32A, 32B may be square or rectangular shaped boards that are secured to outer surfaces of the first and second lateral support posts 22A, 22B (FIG. 1).

Figure 8:
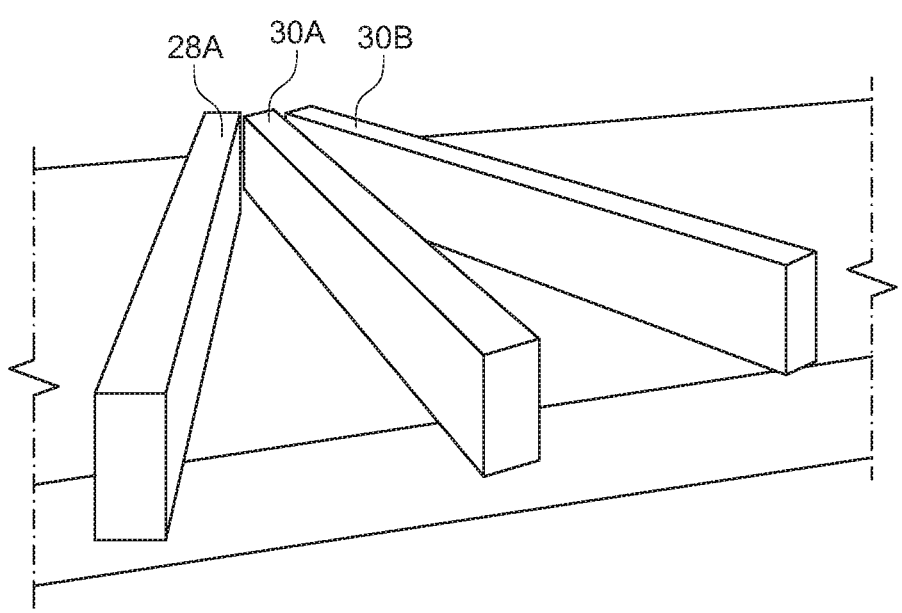
FIG. 8 shows a perspective view of support beams used for making the axe exercise system of FIG. 1, in accordance with embodiment of the present patent application.

Referring to FIG. 8, in one embodiment, the axe exercise system 20 (FIG. 1), preferably includes support beams that are secured over the first and second outer walls 32A, 32B (FIG. 7). The support beams may include a first lower support beam 28A, and first and second upper support beams 30A, 30B. In one embodiment, the support beams 28A, 30A-30B may be secured to the outer walls 32A, 32B shown in FIG. 7 for buttressing the sides of the axe exercise system and for enhancing the structural integrity of the axe exercise system at the upper and lower ends of the outer walls.

Figure 9A:
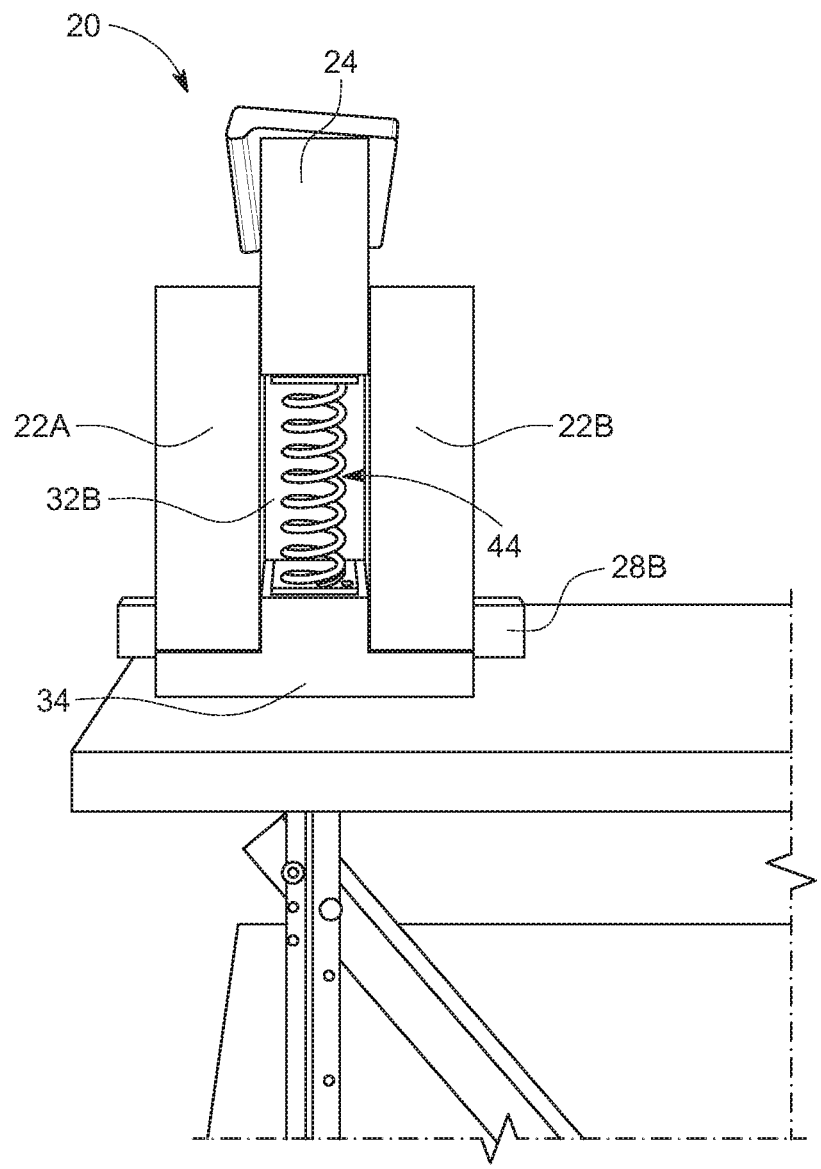
FIG. 9A shows the axe exercise system subassembly having one of the outer walls of FIG. 7 and one of the support beams of FIG. 8 assembled with the subassembly, in accordance with one embodiment of the present patent application.

Referring to FIG. 9A, in one embodiment, after the first and second lateral support posts 22A, 22B, the spring assembly 44 and the strike post 24 have been assembled atop the base 34, the second outer wall 32B may be secured to rear surfaces of the base 34 and the first and second lateral support posts 22A, 22B for enclosing the rear side of the axe exercise system 20. A second lower support beam 28B may then be secured to an outer surface of the second outer wall 32B for enhancing the structural integrity of the lower end of the axe exercise system 20.

Figure 9B:
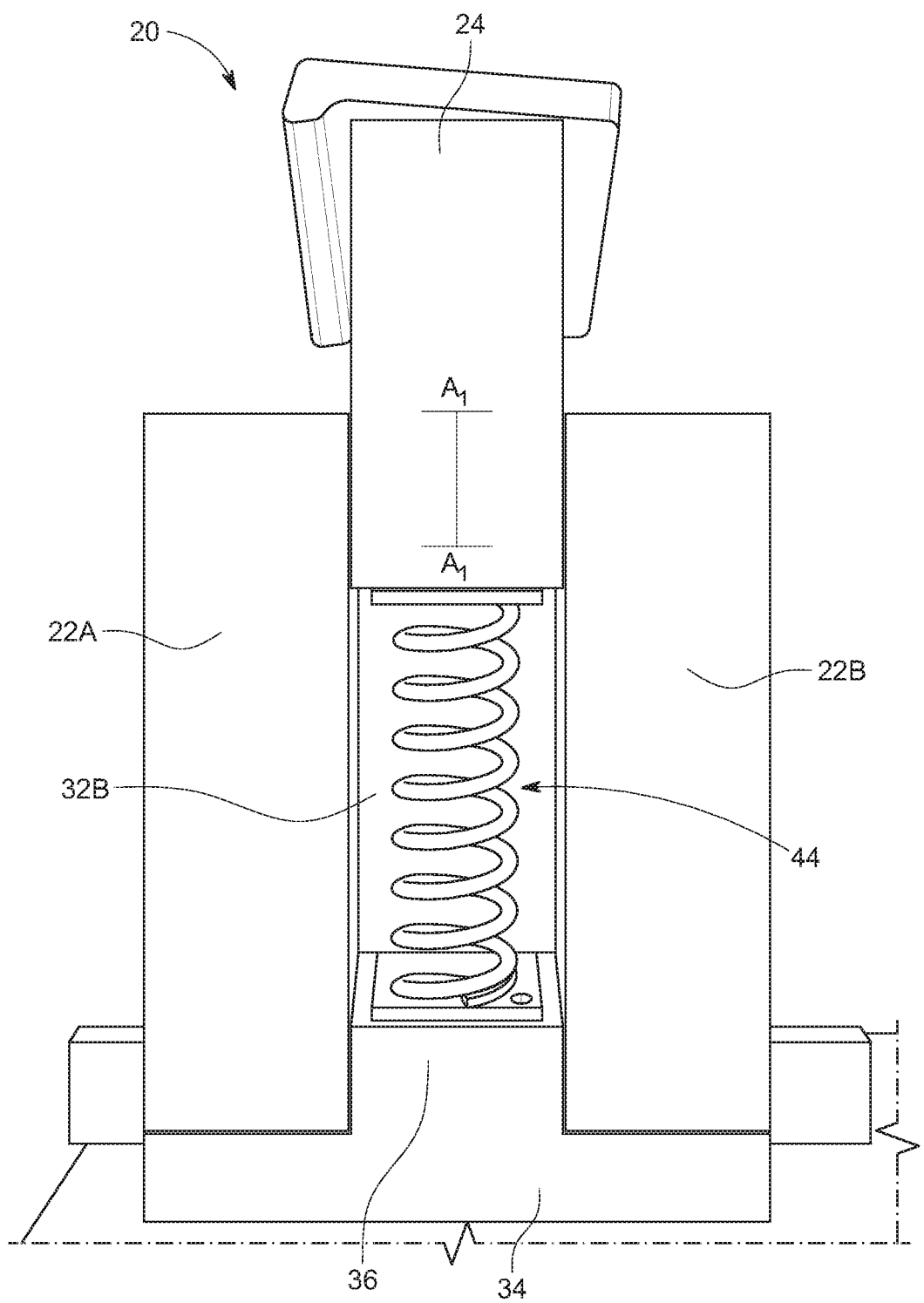
FIG. 9B shows a magnified view of the axe exercise system subassembly, the outer wall and the support beam shown in FIG. 9A.

FIG. 9B shows a magnified view of the axe exercise system subassembly shown in FIG. 9A. The second outer wall 32B has been secured to the rear side surfaces of the base 34 and the first and second lateral support posts 22A, 22B. The spring assembly 44 is disposed between the first and second lateral support posts 22A, 22B, the central platform 36 of the base 34, and the lower end of the strike post 24. The second outer wall 32B at least partially encapsulates the rear side of the spring assembly 44 for maintaining the spring assembly within an interior region of the axe exercise system 20. The lower end of the rear face of the strike post 24 is covered by the second outer wall 32B, and the strike post is free to move up and down along the axis A1 relative to the second outer wall 32B. The second lower support beam 28B is secured over the outer surface of the second outer wall 32B, at the lower end of the second outer wall 32B, to enhance the structural integrity of the lower end of the axe exercise system 20.

Figure 10:
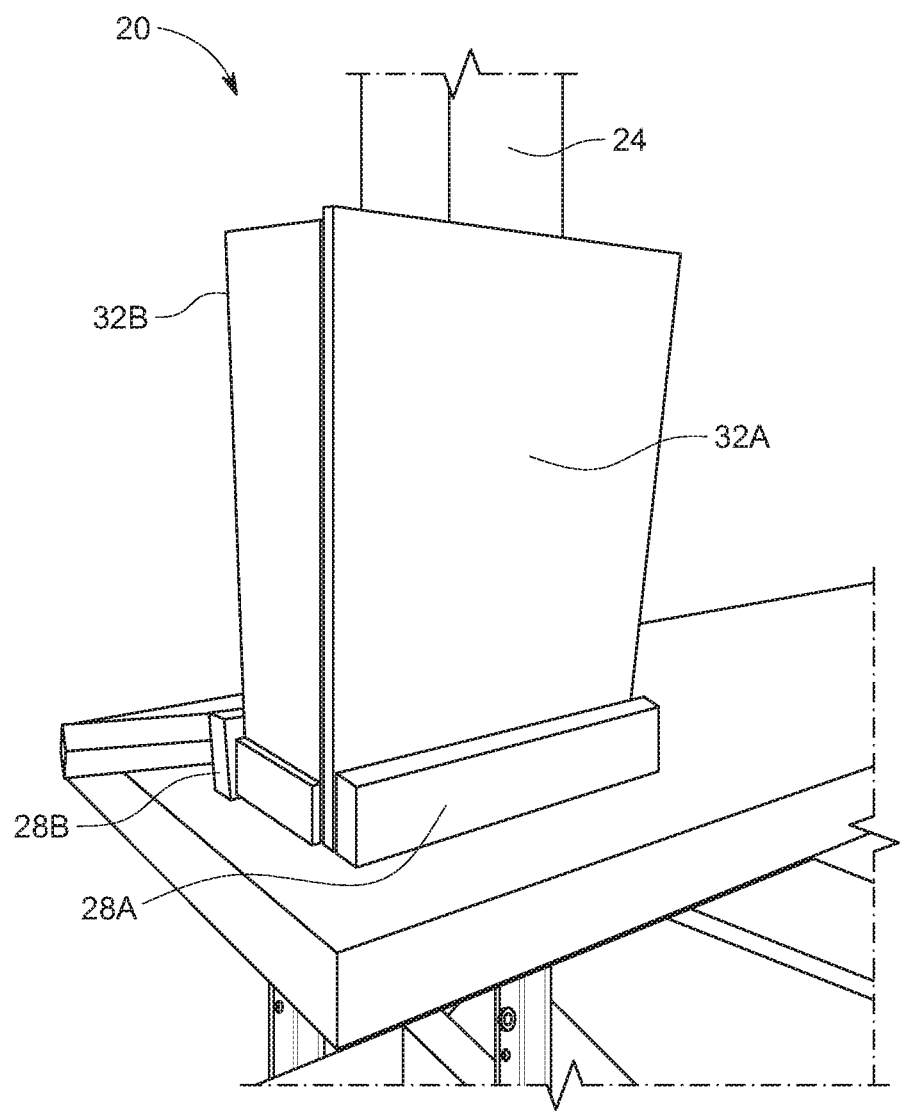
FIG. 10 shows a perspective view of an axe exercise system with the first and second outer walls of FIG. 7 attached to lateral support posts, in accordance with one embodiment of the present patent application.

Referring to FIG. 10, in one embodiment, after the second outer wall 32B has been secured to the rear side of the axe exercise system subassembly 20, the first outer wall 32A may be secured to the front side of the axe exercise system subassembly. The first lower support beam 28A is preferably secured over the lower end of the first outer wall 32A. The second lower support beam 28B is secured over the lower end of the second outer wall 32B. The first lateral support post 22A is positioned between the first and second outer walls 32A, 32B. A lower end of the strike post 24 is also positioned between the opposing first and second outer walls 32A, 32B. The strike post 24 is free to move up and down relative to the first and second outer walls 32A, 32B.

Figure 11:
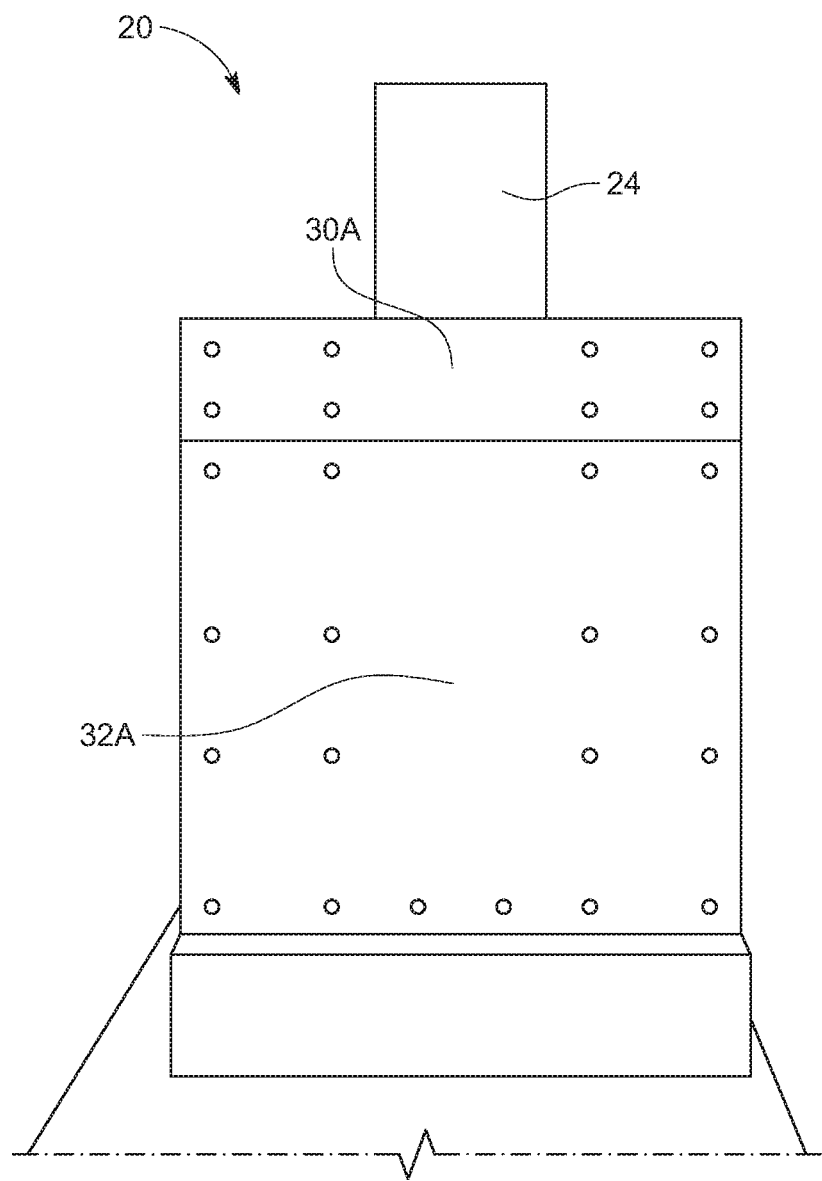
FIG. 11 shows a front elevation view of an axe exercise system, in accordance with one embodiment of the present patent application.

Referring to FIG. 11, in one embodiment, the first upper support beam 30A may be secured over an upper end of the first outer wall 32A. The first upper support beam 30A preferably surrounds a side of the strike post 24 and enhances the structural integrity of the upper end of the axe exercise system 20.

Figure 12:
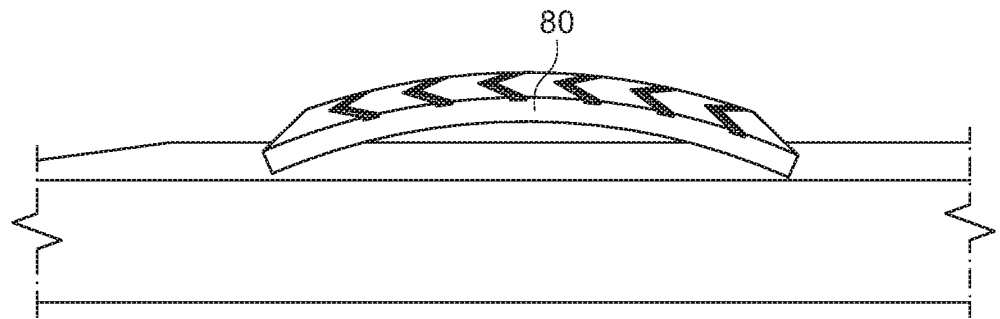
FIG. 12 shows a side view of a shock absorbing pad securable atop a strike post of an axe exercise system, in accordance with one embodiment of the present patent application.

Referring to FIG. 12, in one embodiment, a shock absorbing pad 80 may be secured over the flat top surface at the upper end of the strike post 24 (FIG. 9A). The shock absorbing pad 80 is preferably made of a resilient or compliant material such as rubber or foam. In one embodiment, the shock absorbing pad 80 may be a rubber pad that has been cut from a tire.

Figure 13A:
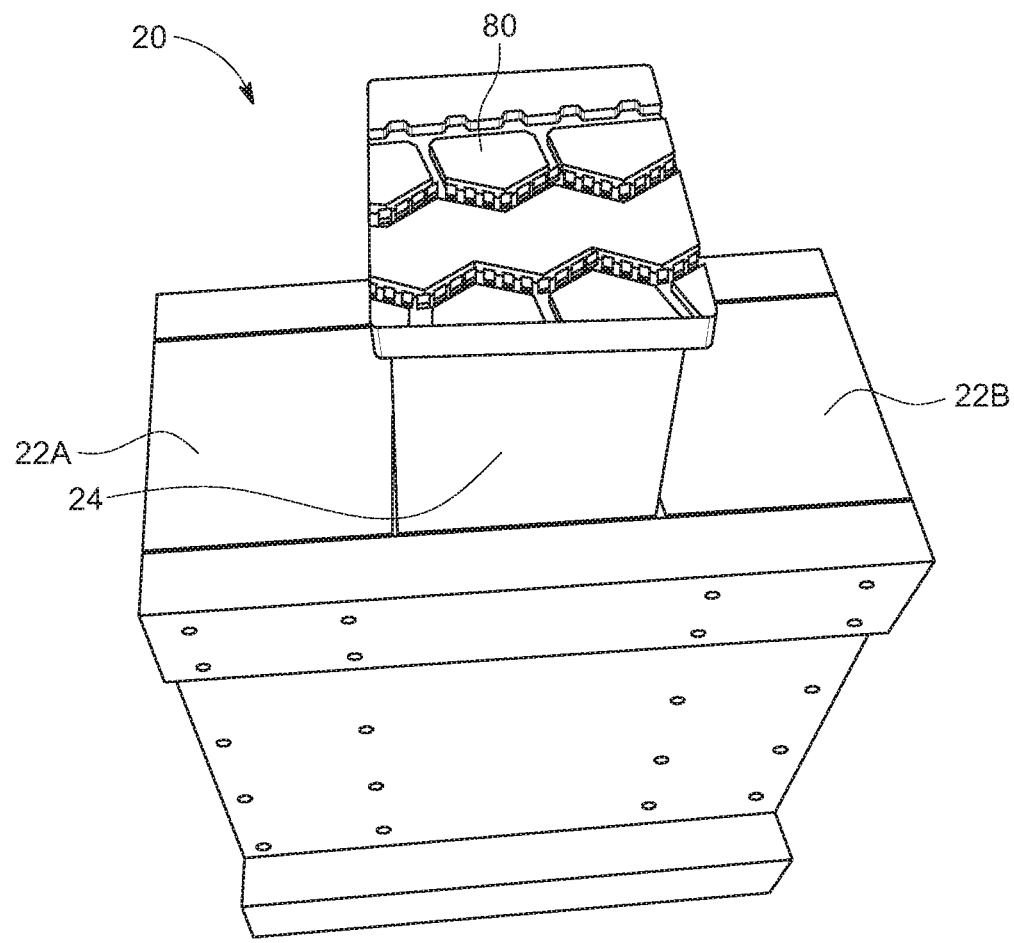
FIG. 13A shows a top perspective view of an axe exercise system, in accordance with one embodiment of the present patent application.

Referring to FIG. 13A, in one embodiment, the shock absorbing pad 80 may be secured over the flat top surface at the upper end of the strike post 24. The shock absorbing pad 80 may be secured to the upper end of the strike post 24 using fasteners such as threaded screws or by using an adhesive material. In one embodiment, a first lateral shock absorbing pad may be secured over the flat top surface 62A of the first lateral support post 22A and a second lateral shock absorbing pad may be secured over the top surface 62B of the second lateral support post 22B. The first and second lateral shock absorbing pads are preferably utilized to provide shock absorbing surfaces to the sides of the strike post 24 in the event that a user attempting to strike the central shock absorbing pad 80 misses the strike post 24 and instead hits either of the upper ends of the first and second lateral support posts 22A, 22B. Thus, in one embodiment, the axe exercise system 20 may include additional shock absorbing pads located on the sides of the strike post 24 for instances in which a user's aim is inaccurate and the user misses hitting the top of the strike post 24.

Figure 13B:
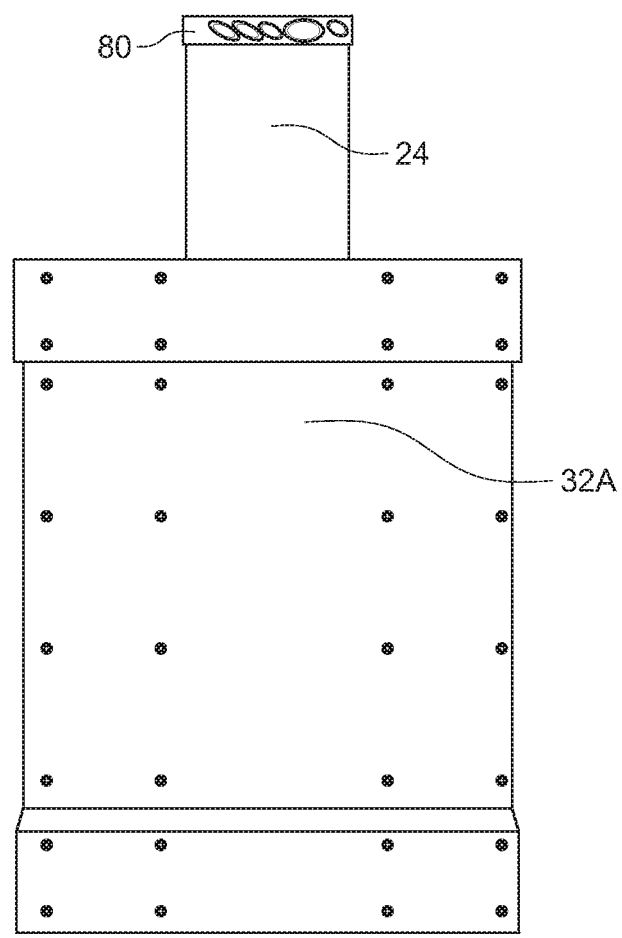
FIG. 13B shows a front elevation view of the axe exercise system shown in FIG. 13A.

Referring to FIG. 13B, in one embodiment, the upper end of the strike post 24 normally projects above the both upper ends of the first and second lateral support posts 62A, 62B (FIG. 13A) and the upper ends of the outer walls 32A, 32B (FIG. 10) secured to the lateral support posts. The central shock absorbing pad 80 is desirably secured to and overlies the flat top surface located that the upper end of the strike post 24.

Figure 14A:
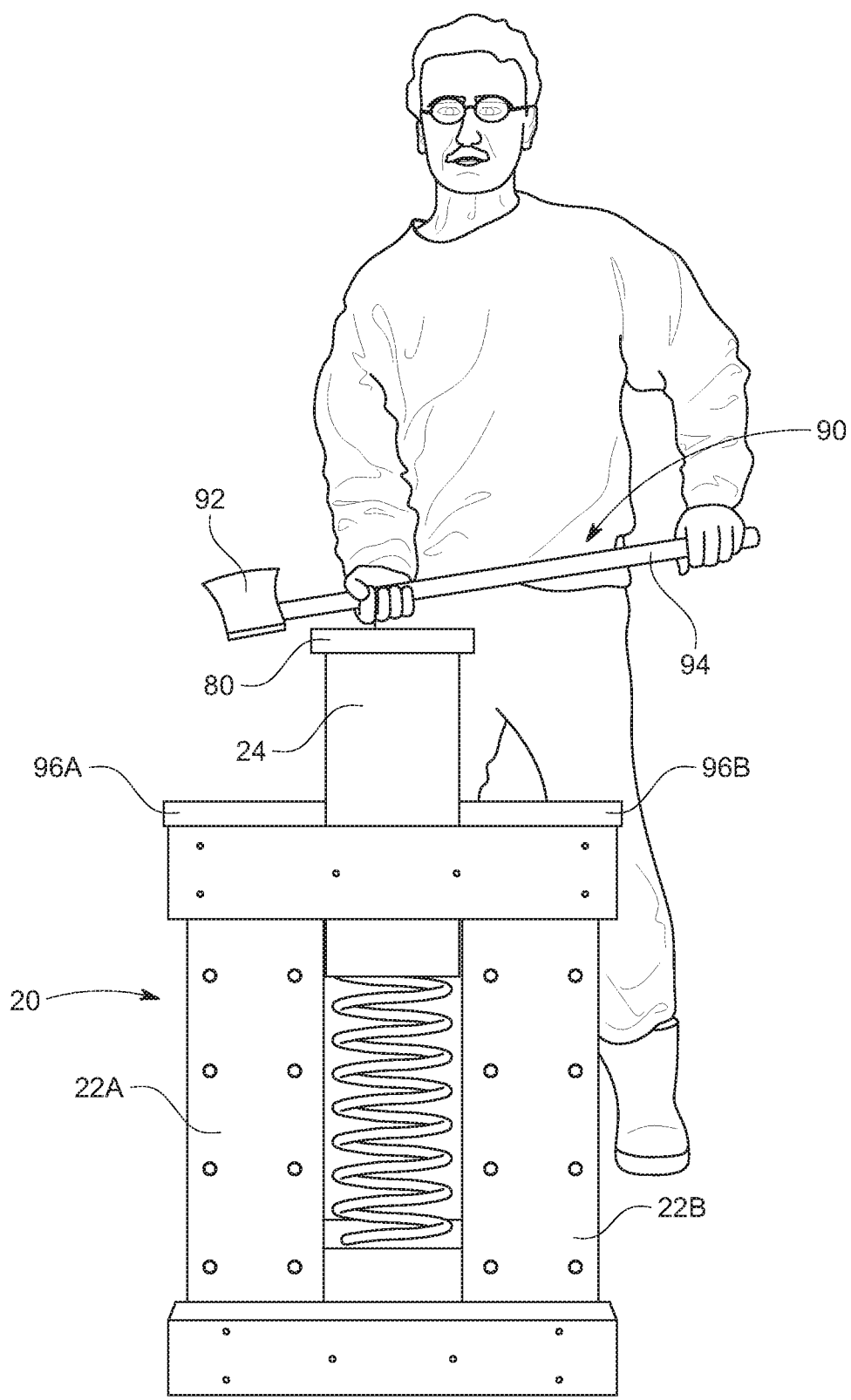
FIG. 14A shows a first step of a method of using an axe exercise system, in accordance with one embodiment of the present patent application.

Referring to FIG. 14A, in one embodiment, the axe exercise system 20 may be utilized for performing exercises such as swinging an axe 90 having an axe head 92 and an elongated handle 94. Other striking tools may be utilized such as sledge hammers.

In one embodiment, the axe exercise system 20 preferably includes a first or central shock absorbing pad 80 that is secured over the top surface of the strike post 24, a first lateral shock absorbing pad 96A that is secured over the top of the first lateral support post 22A (FIG. 1) and a second lateral shock absorbing pad 96B that is secured over the top of the second lateral support post 22B (FIG. 1). In FIG. 14A, the first outer wall 32A (FIG. 1) has been removed to show the configuration of the spring assembly 44 that is disposed between the first lateral support post 22A and the second lateral support post 22B.

In one embodiment, a user may use two hands to grasp the elongated handle 94 of the axe 90. The user preferably stands adjacent the axe exercise system 20 so that the central shock absorbing pad 80 may be hit using the axe head 92 of the axe 90.

Figure 14B:
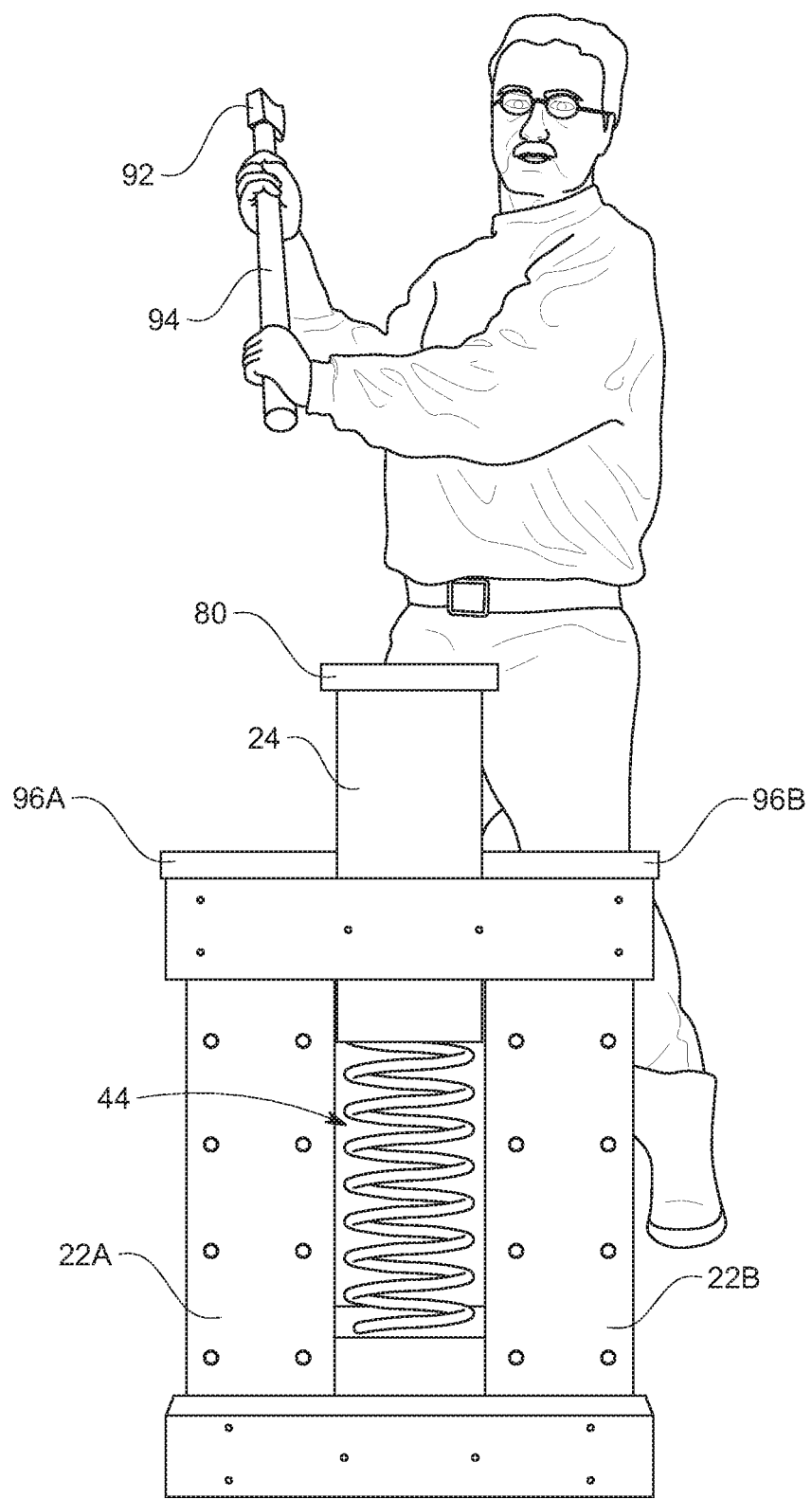
FIG. 14B shows a second step of a method of using the axe exercise system shown in FIG. 14A.

Referring to FIG. 14B, in one embodiment, the user commences an exercise stroke by lifting the axe head 92 and the elongated handle 94 above the shoulders. The user preferably focuses at the central shock absorbing pad 80 secured over the upper end of the strike post 24. The spring assembly 44 is in a fully extended, uncompressed position so that the upper end of the strike post 24 projects prominently above the first and second lateral shock absorbing pads 96A, 96B that overlie the upper ends of the respective first and second lateral support posts 22A, 22B.

Figure 14C:
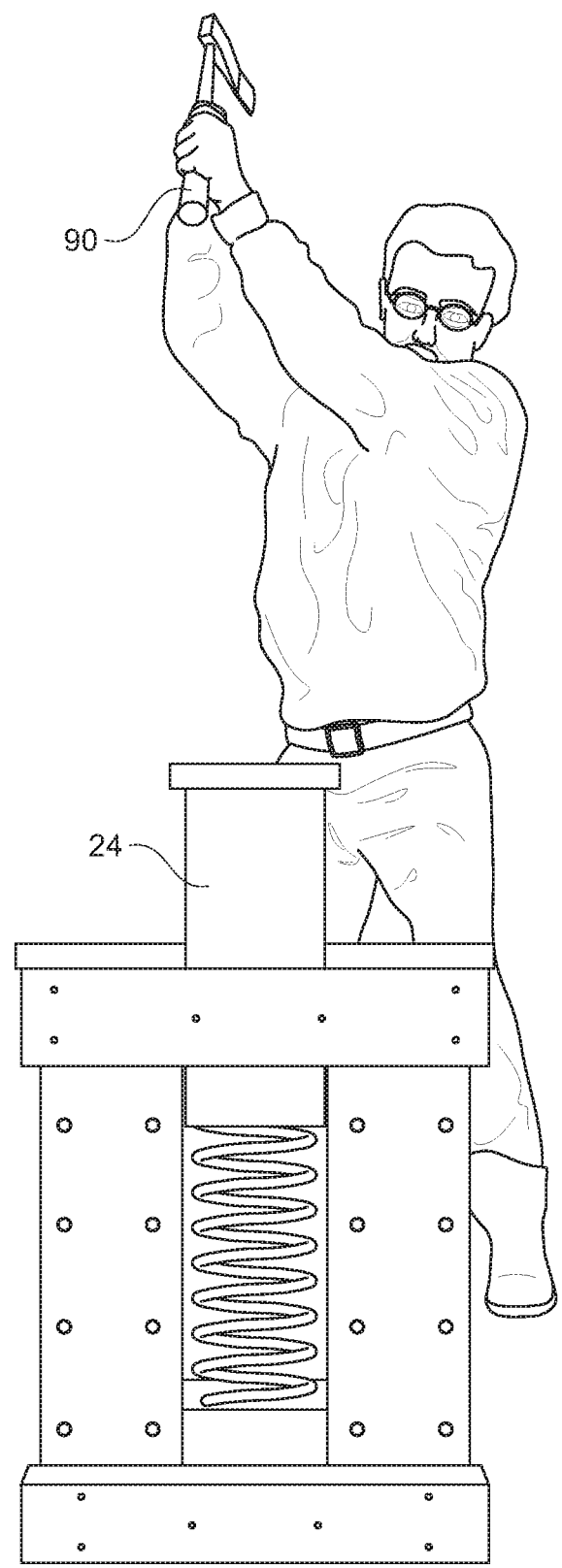
FIG. 14C shows a third step of a method of using the axe exercise system of FIG. 14A.

Referring to FIG. 14C, in one embodiment, the user raises his hands above his head to elevate the axe 90 to a position that is high above the top of the strike post 24.

Figure 14D:
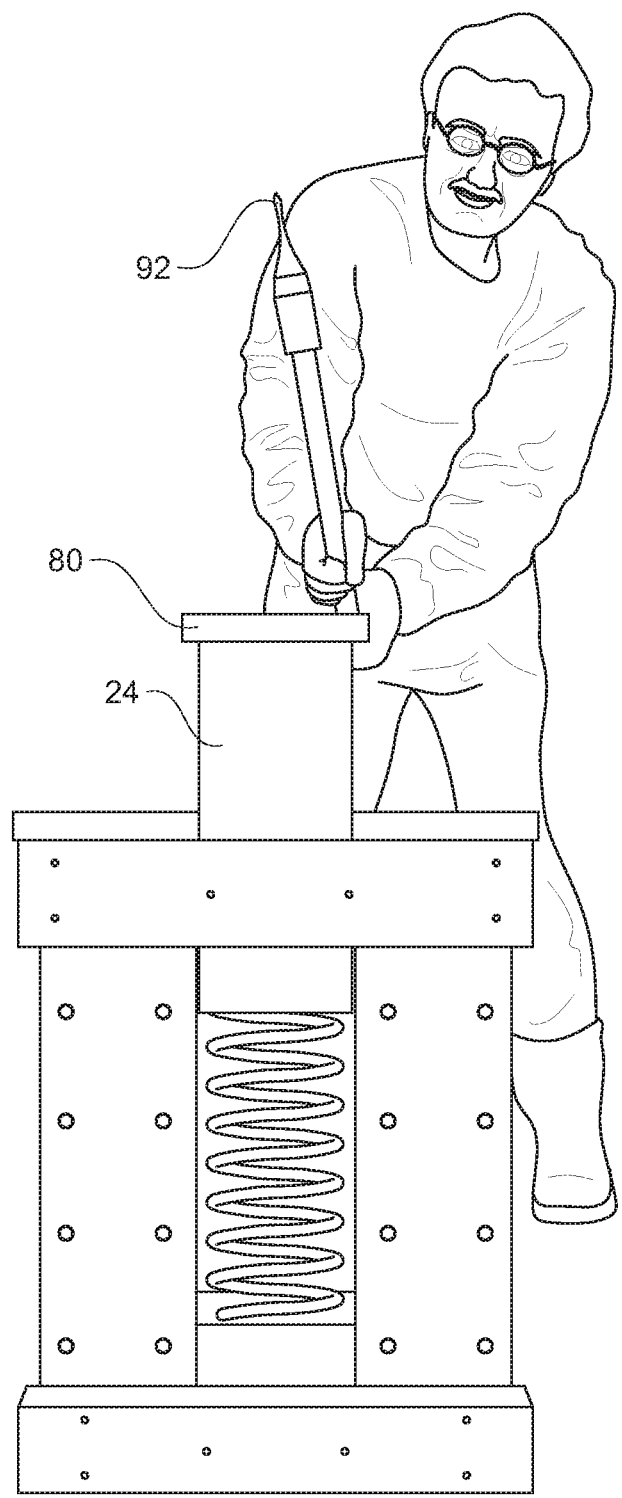
FIG. 14D shows a fourth step of a method of using the axe exercise system of FIG. 14A.

Referring to FIG. 14D, in one embodiment, the user lowers the axe head 92 toward the central shock absorbing pad 80 that is secured over the upper end of the strike post 24.

Figure 14E:
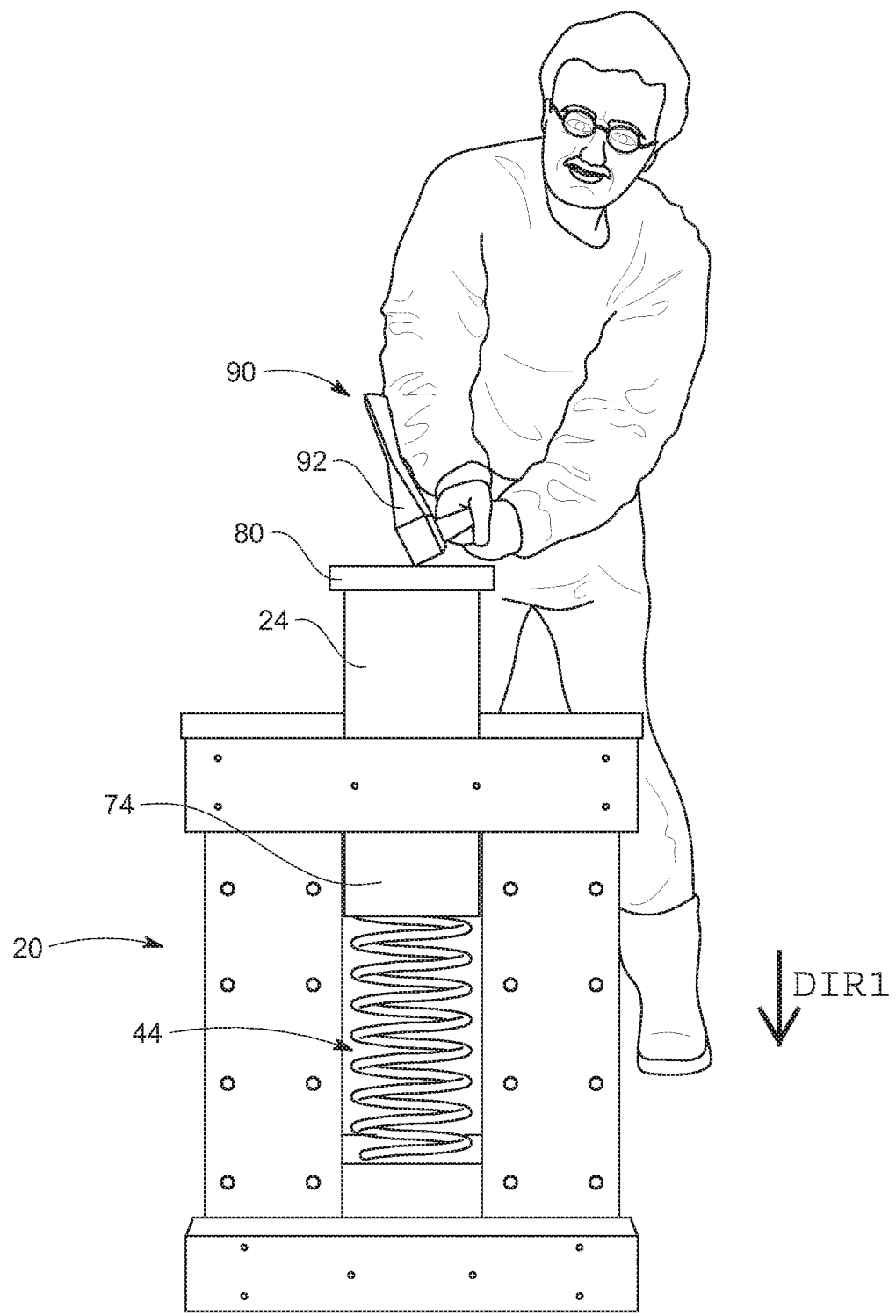
FIG. 14E shows a fifth step of a method of using the axe exercise system of FIG. 14A.

Referring to FIG. 14E, in one embodiment, the user strikes the central shock absorbing pad 80 with the axe head 92 of the axe 90 for driving the strike post 24 in the direction $DIR_1$ toward the base 34 (FIG. 9B) at the lower end of the axe exercise system 20. In one embodiment, the user strikes the central shock absorbing pad using the butt of the axe head 92 and not the blade portion of the axe head. As the force from the axe head 92 is applied to the top of the strike post 24, the strike post 24 moves toward the base 34 (FIG. 9B) whereupon the spring assembly 44 is compressed between the flat bottom surface 74 of the strike post 24 and the central platform 36 of the base 34 (FIG. 9B).

Figure 14F:
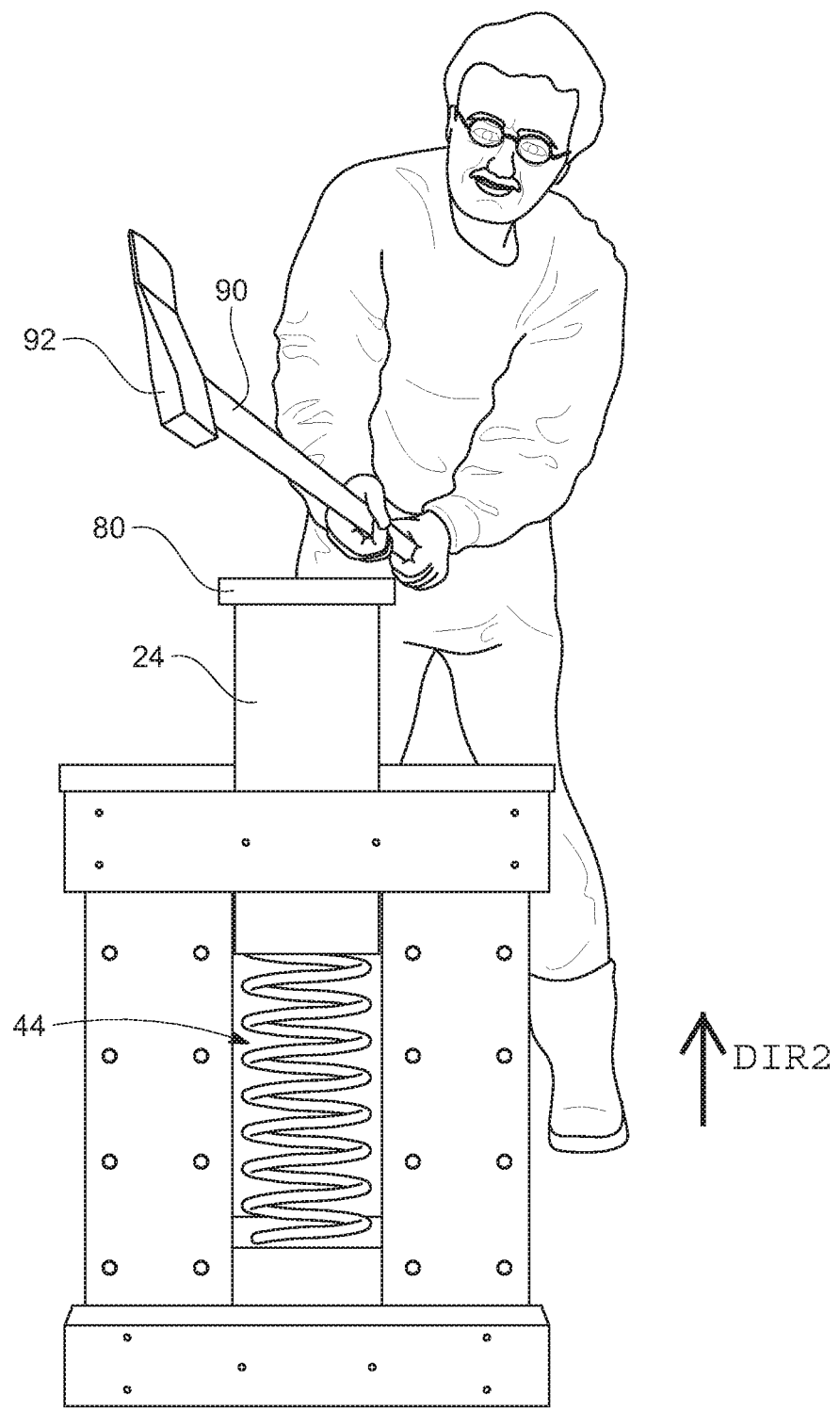
FIG. 14F shows a sixth step of a method of using the axe exercise system of FIG. 14A.

Referring to FIG. 14F, in one embodiment, at the end of a downward stroke of the axe 90, the user preferably lifts the axe head 92 away from the central shock absorbing pad 80, which removes the downward force exerted upon the strike post 24. At this stage, the energy stored in the spring assembly 44 is released for driving the strike post 24 in the upward direction designated $DIR_2$. As the energy is released from the spring assembly 44, the spring assembly 44 desirably returns to its original fully extended, uncompressed position.

Figure 14G:
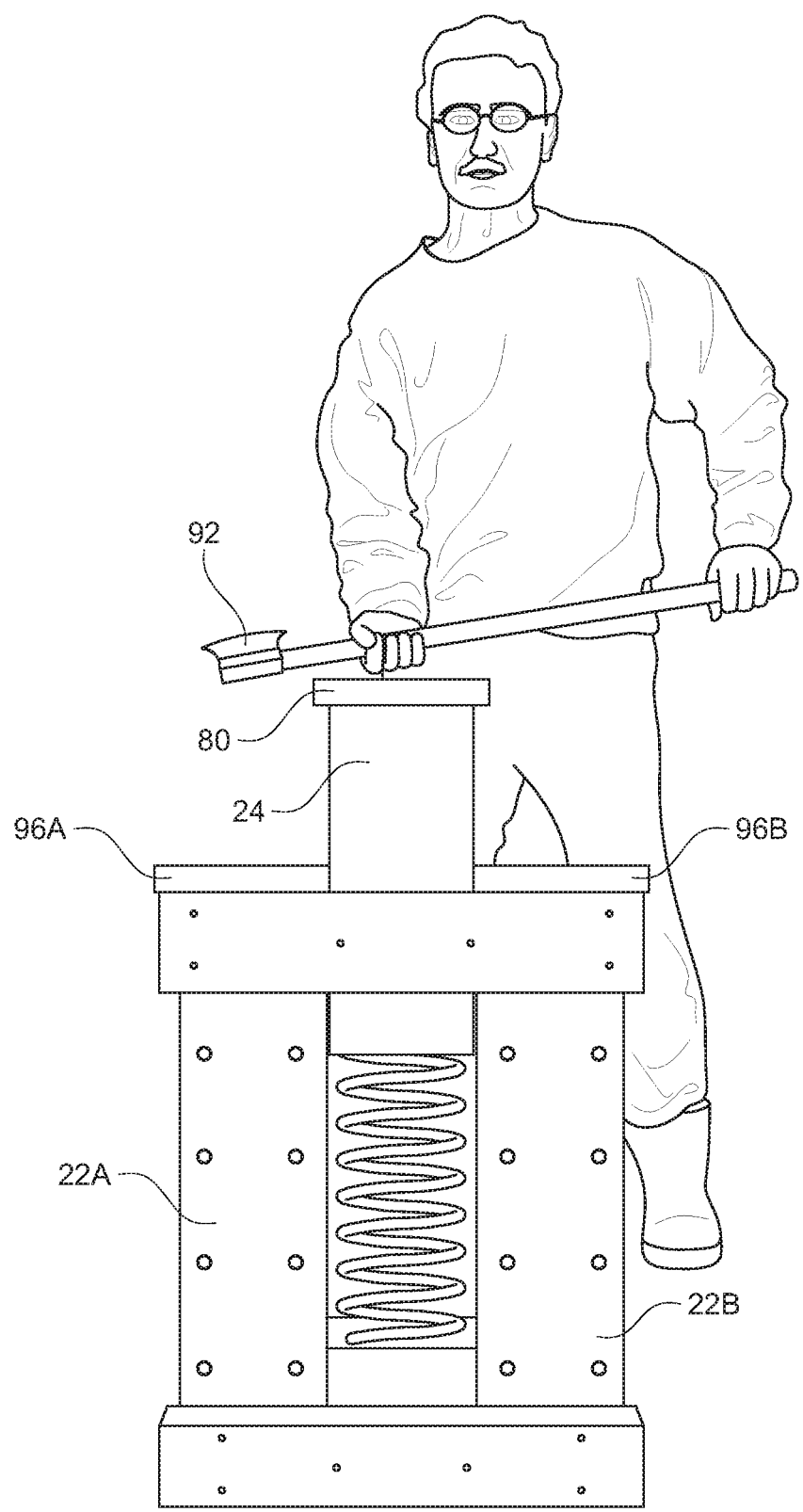
FIG. 14G shows a seventh step of a method of using the axe exercise system of FIG. 14A.

Referring to FIG. 14G, in one embodiment, after the user has completed a full stroke during which the central shock absorbing pad 80 has been struck with the axe head 92, the user returns to a start position for commencing a second axe stroke.

In the event that the user fails to strike the central shock absorbing pad 80 with the axe head 92 (i.e., misses the target), the first and second lateral shock absorbing pads 96A, 96B desirably provide supplemental shock absorbing surfaces located to the sides of the strike post 24. During a miss hit, the axe head 92 will strike one of the first and second lateral shock absorbing pads 96A, 96B for minimizing the shock of hitting the upper ends of the first and second lateral support posts 22A, 22B.

Figure 15A:
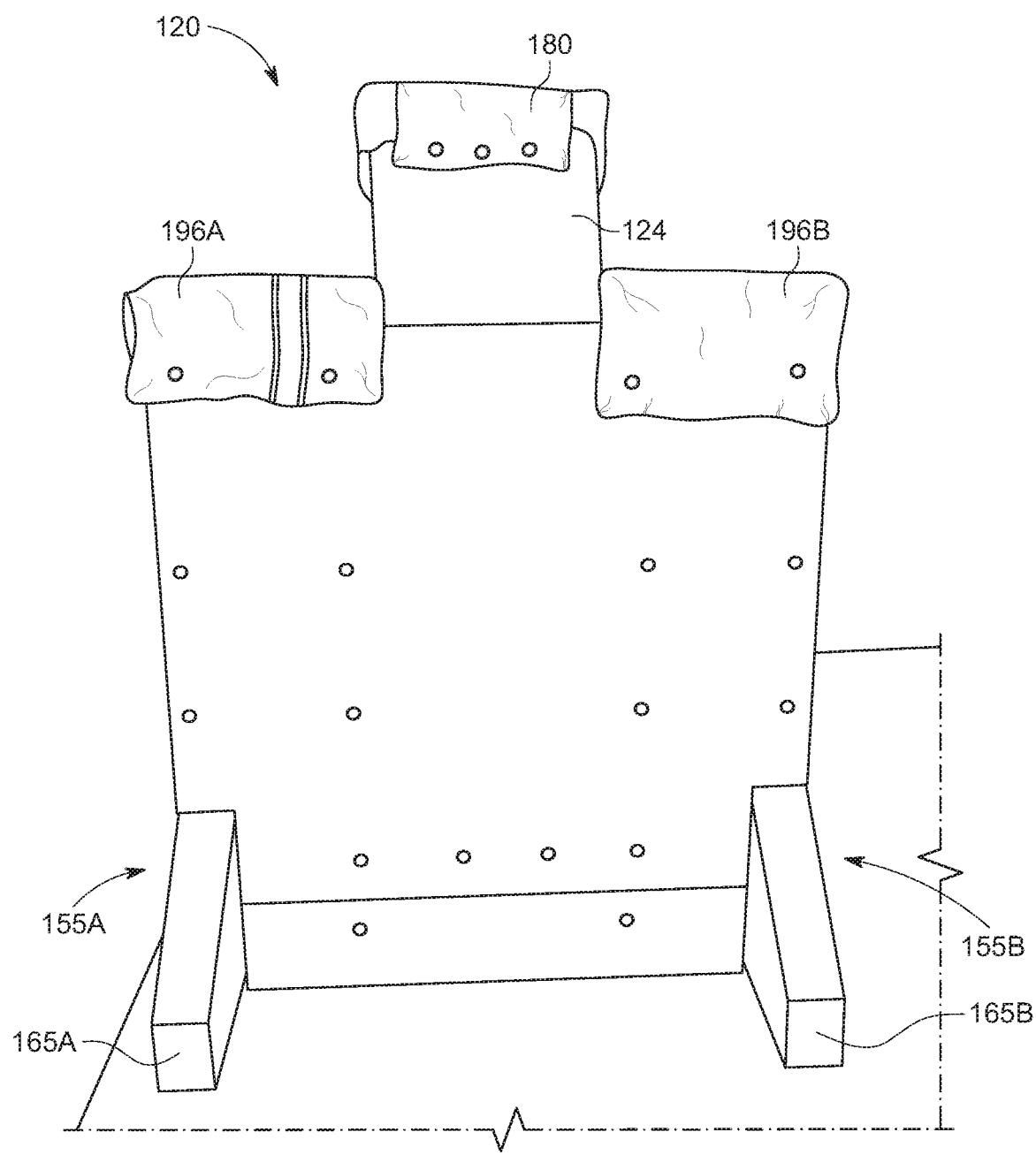
FIG. 15A shows a front view of an axe exerciser system, in accordance with another embodiment of the present patent application.
Figure 15B:
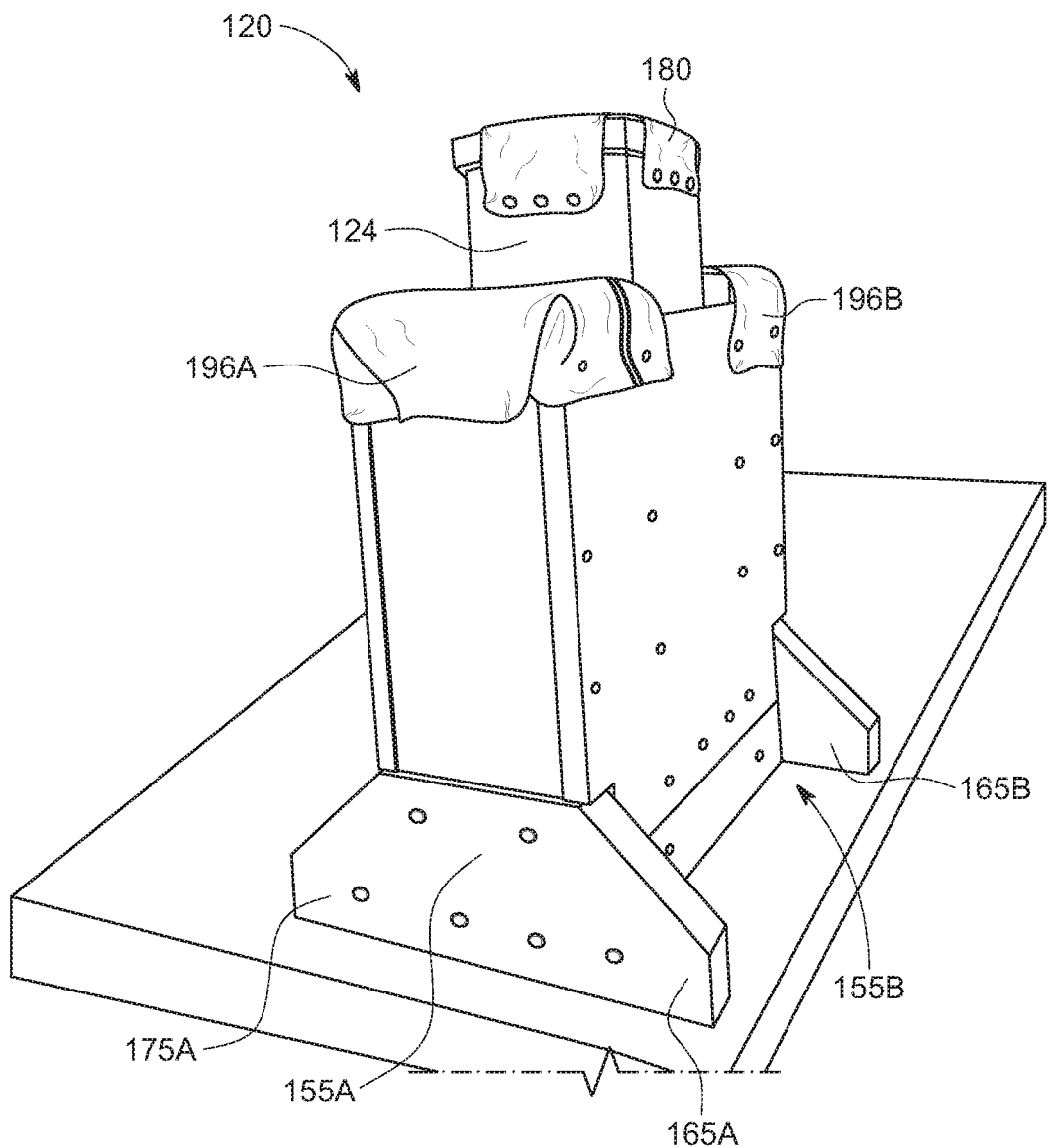
FIG. 15B shows a perspective view of the axe exerciser system shown in FIG. 15A.

In one embodiment, an axe exerciser system may have a widened base for stabilizing a lower end of the housing. Referring to FIGS. 15A and 15B, in one embodiment, an axe exercise system 120 preferably includes a strike post 124 and a central shock absorbing pad 180 that is secured over the top surface of the strike post 124. The central shock absorbing pad 180 may include rubber, foam, canvas, and/or a cut fire hose section. The axe exercise system desirably includes a first lateral shock absorbing pad 196A that is secured over the top of the first lateral support post 22A (FIG. 1) and a second lateral shock absorbing pad 196B that is secured over the top of the second lateral support post 22B (FIG. 1). The first and second lateral shock absorbing pads 196A, 196B may be made of rubber, foam, canvas, and/or cut fire hose material.

In one embodiment, the axe exercise system 120 preferably includes a first base support 155A located under the first lateral shock absorbing pad 196A and a second base support 155B located under the second lateral shock absorbing pad 196B. The first base support 155A preferably has a front side projection 165A and a rear side projection 175A that define a wide base at a first end of the housing that stabilizes the housing of the axe exercise system 120 and prevents the housing from moving, shifting and/or or tipping over during use (e.g., repeatedly swinging an axe at the target). The second base support 155B preferably has a front side projection 165B and a rear side projection (not shown) that define a wide base at a second end of the housing that stabilizes the housing of the axe exercise system 120 and prevents the housing from moving, shifting and/or tipping over during use.

The exerciser systems disclosed herein preferably enable individuals to improve their strength, endurance, accuracy and aim as they practice swinging axes and sledge hammers to simulate making holes in roofs, walls and/or doors. The exercise systems disclosed herein may be used by fire fighters and fire departments for training and exercising individuals so that they may perform their tasks more effectively and efficiently.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. An exercise system se with tools having weighted masses comprising:
    a housing having an upper end and a lower end;
    a strike post having an upper end that is located above the upper end of said housing and a lower end that is located between the upper and lower ends of said housing, wherein said strike post is configured to move along a vertical axis that extends between the upper and lower ends of said housing;
    a shock absorbing pad overlying the upper end of said strike post;
    a spring assembly disposed between the lower end of said strike post and the lower end of said housing, wherein during a physical exercise session an impact force applied to said shock absorbing pad is transferred through said strike post to said spring assembly for compressing said spring assembly;
    wherein said housing comprises a base having a central pedestal and first and second lateral pedestals located on opposite sides of said central pedestal, a first lateral support post positioned atop said first lateral pedestal, a second lateral support post positioned atop said second lateral pedestal, and said spring assembly being positioned atop said central pedestal and being disposed between said first and second lateral support posts.

2. The exercise system as claimed in claim 1, further comprising:
    said first lateral pedestal having a top surface that extends horizontally relative to the vertical axis of movement of said strike post;
    said second lateral pedestal having a top surface that extends horizontally relative to the vertical axis of movement of said strike post; and
    said central pedestal having a top surface that extends horizontally relative to the vertical axis of movement of said strike post, wherein the top surfaces of said first and second lateral pedestals lie in a common plane, and wherein the top surface of said central pedestal lies in a plane that is parallel with the common plane of the top surfaces of said respective first and second lateral pedestals.

3. The exercise system as claimed in claim 2, wherein the top surface of said central pedestal of said base is closer to the upper end of said housing than the top surfaces of said respective first and second lateral pedestals of said base.

4. The exercise system as claimed in claim 3, wherein the top surfaces of said respective first and second lateral support posts lie in a common plane and define the upper end of said housing, and wherein the upper end of said strike post has a top surface that lies in a plane that is parallel with the common plane of the top surfaces of said respective first and second lateral support posts.

5. The exercise system as claimed in claim 4, further comprising:
    a first lateral shock absorbing pad overlying the top surface of said first lateral support post;
    a second lateral shock absorbing pad overlying the top surface of said second lateral support post.

6. The exercise system as claimed in claim 5, wherein said first and second lateral shock absorbing pads are located on opposite sides of said shock absorbing pad overlying the upper end of said strike post.

7. The exercise system as claimed in claim 2, further comprising:
    said first lateral support post having an upper end with a top surface and a lower end with a bottom surface, wherein the bottom surface of said first lateral support post engages the top surface of said first lateral pedestal; and
    said second lateral support post having an upper end with a top surface and a lower end with a bottom surface, wherein the bottom surface of said second lateral support post engages the top surface of said second lateral pedestal.

8. The exercise system as claimed in claim 7, wherein said spring assembly comprises:
    a helical spring having an upper end and a lower end;
    an upper plate secured to the upper end of said helical spring;
    a lower plate secured to the lower end of said helical spring, wherein said upper plate of said spring assembly is in contact with a bottom surface at the lower end of said strike post and said lower plate of said spring assembly is in contact with the top surface of said central pedestal of said base, and wherein said helical spring is in alignment with the vertical axis of movement of said strike post.

9. The exercise system as claimed in claim 8, further comprising:
    a first outer wall secured to front faces of said respective first and second lateral support posts and a front face of said base;
    a second outer wall secured to rear faces of said first and second lateral support posts and a rear face of said base, wherein said spring assembly and the lower end of said strike post are disposed between said first and second outer walls, and wherein said strike post is free to move along the vertical axis relative to said first and second outer walls.

10. The exercise system as claimed in claim 9, further comprising:
    a first lower support brace secured to a lower end of said first outer wall;
    a second lower support brace secured to a lower end of said second outer wall;

a first upper support brace secured to an upper end of said first outer wall; and a second upper support brace secured to an upper end of said second outer wall.

11. The exercise system as claimed in claim 1, wherein the upper end of said strike post comprises a horizontally extending top surface, and wherein said shock absorbing pad is secured over the horizontally extending top surface of said strike post.

12. The exercise system as claimed in claim 1, wherein said shock absorbing pad overlying the upper end of said strike post is made of materials selected from the group consisting of rubber, foam, and polymers.

13. An exercise system for use with tools having weighted masses comprising:

a housing having an upper end and a lower end, wherein the upper end of said housing defines a central region and first and second lateral regions that bound opposite sides of the central region;

a strike post projecting from the central region of the upper end of said housing, said strike post having an upper end with a top surface that is located above the upper end of said housing and a lower end with a bottom surface that is located between the upper and lower ends of said housing, wherein said strike post is configured to move along a vertical axis that extends between the upper and lower ends of said housing;

a central shock absorbing pad overlying the top surface of said strike post;

a first lateral shock absorbing pad overlying the first lateral region of the upper end of said housing;

a second lateral shock absorbing pad overlying the second lateral region of the upper end of said housing;

a spring assembly disposed between the bottom surface of said strike post and the lower end of said housing, wherein during a physical exercise session an impact force applied to said central shock absorbing pad is transferred through said strike post to said spring assembly for compressing said spring assembly.

14. The exercise system as claimed in claim 13, wherein said housing comprises:

a base located at the lower end of said housing having a central pedestal and first and second lateral pedestals located on opposite sides of said central pedestal;

a first lateral support post positioned atop said first lateral pedestal and having an upper end defining the first lateral region of the upper end of said housing;

a second lateral support post positioned atop said second lateral pedestal and having an upper end defining the second lateral region of the upper end of said housing;

said spring assembly being positioned atop said central pedestal and being disposed between said first and second lateral support posts.

15. The exercise system as claimed in claim 14, further comprising:

said first lateral pedestal of said base having a top surface that extends horizontally relative to the vertical axis of movement of said strike post;

said second lateral pedestal of said base having a top surface that extends horizontally relative to the vertical axis of movement of said strike post; and said central pedestal of said base having a top surface that extends horizontally relative to the vertical axis of movement of said strike post, wherein the top surfaces of said first and second lateral pedestals lie in a common plane, and wherein the top surface of said central pedestal lies in a plane that is parallel with the common plane of the top surfaces of said first and second lateral pedestals.

16. The exercise system as claimed in claim 15, further comprising:

said first lateral support post having the upper end with a top surface and a lower end with a bottom surface, wherein the bottom surface of said first lateral support post engages the top surface of said first lateral pedestal of said base; and said second lateral support post having the upper end with a top surface and a lower end with a bottom surface, wherein the bottom surface of said second lateral support post engages the top surface of said second lateral pedestal of said base.

17. The exercise system as claimed in claim 16, wherein said spring assembly comprises:

a helical spring having an upper end and a lower end;

an upper plate secured to the upper end of said helical spring;

a lower plate secured to the lower end of said helical spring, wherein said upper plate of said spring assembly is in contact with the bottom surface of said strike post and said lower plate of said spring assembly is in contact with the top surface of said central pedestal of said base, and wherein said helical spring is in alignment with the vertical axis of movement of said strike post.

18. The exercise system as claimed in claim 17, further comprising:

a first outer wall secured to front faces of said respective first and second lateral support posts and a front face of said base;

a second outer wall secured to rear faces of said first and second lateral support posts and a rear face of said base, wherein said spring assembly and the lower end of said strike post are disposed between said first and second outer walls, and wherein said strike post is free to move along the vertical axis relative to said first and second outer walls.

19. The exercise system as claimed in claim 13, wherein said central and first and second lateral shock absorbing pads are made of materials selected from the group consisting of rubber, foam, and polymers.

* * * * *